US012033563B2

(12) United States Patent
Kim et al.

(10) Patent No.: US 12,033,563 B2
(45) Date of Patent: Jul. 9, 2024

(54) DISPLAY PANEL DRIVING CIRCUIT AND DISPLAY DEVICE INCLUDING SAME

(71) Applicant: Samsung Display Co., LTD., Yongin-si (KR)

(72) Inventors: Jung-Taek Kim, Yongin-si (KR); Seungho Park, Yongin-si (KR); Joonsuk Baik, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/239,384

(22) Filed: Aug. 29, 2023

(65) Prior Publication Data

US 2024/0144856 A1 May 2, 2024

(30) Foreign Application Priority Data

Nov. 2, 2022 (KR) ........................ 10-2022-0144342

(51) Int. Cl.

| | |
|---|---|
| ***G09G 3/20*** | (2006.01) |
| ***G09G 3/00*** | (2006.01) |
| ***G09G 3/3233*** | (2016.01) |
| ***G09G 3/3275*** | (2016.01) |

(52) U.S. Cl.

CPC ........... *G09G 3/2096* (2013.01); *G09G 3/006* (2013.01); *G09G 3/3233* (2013.01); *G09G 3/3275* (2013.01); *G09G 2300/0426* (2013.01); *G09G 2300/0819* (2013.01); *G09G 2300/0842* (2013.01); *G09G 2310/0202* (2013.01); *G09G 2310/08* (2013.01); *G09G 2320/041* (2013.01);

(Continued)

(58) Field of Classification Search

CPC .... G09G 3/2096; G09G 3/006; G09G 3/3233; G09G 3/3275; G09G 2300/0426; G09G 2300/0819; G09G 2300/0842; G09G 2310/0202; G09G 2310/08; G09G 2320/041; G09G 2320/045; G09G 2330/08; G09G 2330/12

See application file for complete search history.

(56) References Cited

U.S. PATENT DOCUMENTS

| | | | | |
|---|---|---|---|---|
| 9,922,598 | B2 | 3/2018 | Park et al. | |
| 10,102,801 | B2 * | 10/2018 | Jin ........................ | G09G 3/3233 |
| 10,319,286 | B2 | 6/2019 | Do et al. | |

(Continued)

FOREIGN PATENT DOCUMENTS

| | | | |
|---|---|---|---|
| KR | 1020180049285 | A | 5/2018 |
| KR | 102322708 | B1 | 11/2021 |

*Primary Examiner* — Dmitriy Bolotin

(74) *Attorney, Agent, or Firm* — CANTOR COLBURN LLP

(57) ABSTRACT

A display device includes a display panel which operates in a sensing mode or an emission mode, and a data driver electrically connected to the display panel. The display panel includes a first pixel, a second pixel, a third pixel, a fourth pixel, a fifth pixel, a sixth pixel, a first scan line, a second scan line, a first data line, the second pixel. The data driver includes a first switch, a second switch, and an analog front end. The sensing mode includes a first period in which a first scan signal is provided to the first scan line and the first switch is turned on, a second period in which the first scan signal is provided to the first scan line and the second switch is turned on, and a third period in which a second scan signal is provided to the second scan line.

20 Claims, 11 Drawing Sheets

(52) U.S. Cl.
CPC ... *G09G 2320/045* (2013.01); *G09G 2330/08* (2013.01); *G09G 2330/12* (2013.01)

(56) References Cited

U.S. PATENT DOCUMENTS

| | | | | |
|---|---|---|---|---|
| 10,971,556 | B1 * | 4/2021 | Fang | H10K 59/131 |
| 2008/0180365 | A1 * | 7/2008 | Ozaki | G09G 3/3233 345/76 |
| 2008/0252569 | A1 * | 10/2008 | Kwon | G09G 3/3233 345/76 |
| 2011/0227505 | A1 * | 9/2011 | Park | H05B 45/60 315/297 |
| 2017/0372677 | A1 * | 12/2017 | Chang | H01L 31/16 |
| 2018/0096649 | A1 * | 4/2018 | Lee | G09G 3/3233 |
| 2021/0166635 | A1 * | 6/2021 | In | G09G 3/3275 |
| 2021/0366406 | A1 * | 11/2021 | Jang | G09G 3/3258 |
| 2022/0148498 | A1 * | 5/2022 | Kim | G09G 3/32 |
| 2022/0415266 | A1 * | 12/2022 | Jung | G09G 3/3291 |
| 2024/0062702 | A1 * | 2/2024 | Son | G09G 3/32 |

* cited by examiner

DISPLAY PANEL DRIVING CIRCUIT AND DISPLAY DEVICE INCLUDING SAME

This application claims priority to Korean Patent Application No. 10-2022-0144342, filed on Nov. 2, 2022, and all the benefits accruing therefrom under 35 U.S.C. § 119, the content of which in its entirety is herein incorporated by reference.

BACKGROUND

1. Field

Embodiments of the disclosure described herein relate to a display panel driving circuit with improved display quality, and more particularly, relate to a display device including the display panel driving circuit.

2. Description of the Related Art

Generally, electronic devices, which provide images to users, such as a smartphone, a digital camera, a notebook computer, a navigation system, and a smart television include a display device for displaying the images. The display device generates an image and provides the users with the generated image through a display screen.

The display device includes a display panel including a plurality of pixels for generating an image, a scan driver for applying scan signals to the pixels, a data driver for applying data voltages to the pixels, and a voltage generator for applying an operating voltage to the pixels. The pixels may receive the data voltages in response to the scan signals, and then may generate an image by using the data voltages and the operating voltage.

Each of the pixels typically include transistors and light emitting elements connected to the transistors. As a usage time of the pixels increases, the transistors may deteriorate (e.g., may degrade in performance). As the transistors deteriorate, current-voltage characteristic curves (I-V curves) of the transistors may be changed.

SUMMARY

In a display device where each pixel includes transistors and light emitting elements connected to the transistors, even though a same voltage is applied to the transistors when the transistors deteriorate, a current flowing through the transistors may decrease. Moreover, current-voltage characteristic curves (I-V curves) of the transistors may be changed depending on the temperature of the display panel. Accordingly, it is desired to develop a technology for compensating for data voltages applied to the transistors depending on the deterioration state of the transistors and the temperature of the display panel.

Embodiments of the disclosure provide a display device with improved display quality.

According to an embodiment, a display device includes a display panel which operates in a sensing mode or an emission mode, a data driver electrically connected to the display panel, and a compensation part electrically connected to the data driver. In such an embodiment, the display panel includes a first pixel, a second pixel spaced from the first pixel in a first direction, a third pixel spaced from the second pixel in the first direction, a fourth pixel spaced from the third pixel in the first direction, a fifth pixel spaced from the first pixel in a second direction crossing the first direction, a sixth pixel spaced from the second pixel in the second direction, a first scan line electrically connected to the first pixel and the third pixel, a second scan line electrically connected to the sixth pixel, a first data line electrically connected to the first pixel, the second pixel, the fifth pixel, and the sixth pixel, and a second data line electrically connected to the third pixel and the fourth pixel. In such an embodiment, the data driver includes a first switch electrically connected to the first pixel and the second pixel, and a second switch electrically connected to the third pixel and the fourth pixel. The sensing mode includes a first period in which a first scan signal is provided to the first scan line and the first switch is turned on, and a second period in which the first scan signal is provided to the first scan line and the second switch is turned on. In such an embodiment, the compensation part compensates for image data, which is to be provided to the second pixel, based on a voltage sensed in each of the first pixel, the third pixel, and the sixth pixel.

In an embodiment, the first pixel may include a light emitting diode and a pixel driving circuit electrically connected to the light emitting diode. In such an embodiment, the pixel driving circuit may include a driving transistor which drives the light emitting diode, a sensing transistor electrically connected between a first node of the driving transistor and a reference voltage line, and a switching transistor electrically connected between a second node of the driving transistor and the first data line and including a gate node connected to the first scan line.

In an embodiment, the sensing transistor may be electrically connected to a sensing line, and the sensing line may be electrically connected to the first switch.

In an embodiment, the display panel may further include a seventh pixel spaced from the third pixel in the second direction, an eighth pixel spaced from the fourth pixel in the second direction, a third scan line electrically connected to the second pixel and the fourth pixel, and a fourth scan line electrically connected to the fifth pixel and the seventh pixel. In such an embodiment, the second scan line may be further electrically connected to the eighth pixel, and the second data line may be further electrically connected to the seventh pixel and the eighth pixel.

In an embodiment, the sensing mode may further include a third period in which a third scan signal is provided to the third scan line, and the first period, the second period, and the third period may be defined sequentially in the sensing mode.

In an embodiment, a first width of the first period may be equal to a second width of the second period, and a third width of the third period may be less than the first width and the second width.

In an embodiment, in the first period, the second switch may be turned off. In the second period, the first switch may be turned off. In the third period, the first switch and the second switch may be turned off.

In an embodiment, in the third period, the second pixel and the fourth pixel may display black.

In an embodiment, the sensing mode may further include a fourth period in which a fourth scan signal is provided to the fourth scan line, a fifth period in which a second scan signal is provided to the second scan line and the first switch is turned on, and a sixth period in which the second scan signal is provided to the second scan line and the second switch is turned on.

In an embodiment, a voltage of the first pixel may be measured in the first period, and a voltage of the third pixel may be measured in the second period.

In an embodiment, the emission mode may proceed after the sensing mode.

In an embodiment, the compensation part may compensate for image data, which is to be provided to the first pixel, based on a voltage sensed in the first period.

According to an embodiment, a display device includes a display panel which operates a sensing mode and an emission mode, and a data driver electrically connected to the display panel. In such an embodiment, the display panel includes a first pixel row including a first pixel, a second pixel, a third pixel, and a fourth pixel, which are arranged in a first direction, a second pixel row spaced from the first pixel row in a second direction crossing the first direction and including a fifth pixel, a sixth pixel, a seventh pixel, and an eighth pixel, which are arranged in the first direction, a first scan line electrically connected to at least one pixel of the first pixel row, a second scan line electrically connected to at least one pixel of the second pixel row, a first data line electrically connected to the first pixel, the second pixel, the fifth pixel, and the sixth pixel, a second data line electrically connected to the third pixel, the fourth pixel, the seventh pixel, and the eighth pixel, a first sensing line electrically connected to the first pixel, the second pixel, the fifth pixel, and the sixth pixel, and a second sensing line electrically connected to the third pixel, the fourth pixel, the seventh pixel, and the eighth pixel. In such an embodiment, the data driver includes a first switch connected to the first sensing line and a second switch connected to the second sensing line. In such an embodiment, the sensing mode includes a first period in which the first switch is turned on and the second switch is turned off, a second period, which is after the first period and in which the first switch is turned off and the second switch is turned on, a third period, which is after the second period and in which the first switch is turned on and the second switch is turned off, and a fourth period, which is after the third period and in which the first switch is turned off and the second switch is turned on.

In an embodiment, in the first period, a first scan signal may be provided to the first scan line and a voltage of the first pixel may be sensed through the first sensing line. In such an embodiment, in the second period after the first period, the first scan signal may be provided to the first scan line, and a voltage of the third pixel is sensed through the second sensing line. In such an embodiment, in the third period after the second period, a second scan signal may be provided to the second scan line, and a voltage of the sixth pixel may be sensed through the first sensing line. In such an embodiment, in the fourth period after the third period, the second scan signal may be provided to the second scan line, and a voltage of the eighth pixel may be sensed through the second sensing line.

In an embodiment, the display panel may further include a third scan line electrically connected to remaining pixels of the first pixel row, and a fourth scan line electrically connected to remaining pixels of the second pixel row. The sensing mode may further include a fifth period, which is between the second period and the third period and in which a third scan signal is provided to the third scan line, and a sixth period, which is between the fifth period and the third period and in which a fourth scan signal is provided to the fourth scan line.

In an embodiment, a first width of the first period may be equal to a second width of the second period, and a third width of the fifth period may be less than the first width and the second width.

In an embodiment, in the fifth period, the second pixel and the fourth pixel may display black.

In an embodiment, the display device may further include a compensation part electrically connected to the data driver. The compensation part may compensate for image data, which is to be provided to the display panel, based on voltages sensed in the first to fourth periods.

In an embodiment, the emission mode may proceed after the sensing mode.

According to an embodiment, a display panel driving circuit includes a data driver including a first switch connected to a first data line, and a second switch connected to a second data line spaced from the first data line in a first direction, where the data driver senses a sensing voltage, a scan driver which generates a first scan signal and a second scan signal and electrically connected to a first scan line and a second scan line, which are arranged in a second direction crossing the first direction, and a timing controller which receives the sensing voltage, compensates for image data based on the sensing voltage, and controls the data driver and the scan driver based on a sensing mode or an emission mode. In such an embodiment, the sensing mode includes a first period in which the first scan signal is provided to the first scan line, the first switch is turned on, and the second switch is turned off, a second period in which the first scan signal is provided to the first scan line, the first switch is turned off, and the second switch is turned on, and a third period in which the second scan signal is provided to the second scan line, and the first switch and the second switch are turned off.

BRIEF DESCRIPTION OF THE DRAWINGS

The above and other features of the disclosure will become apparent by describing in detail embodiments thereof with reference to the accompanying drawings.

DETAILED DESCRIPTION

Figure 1:
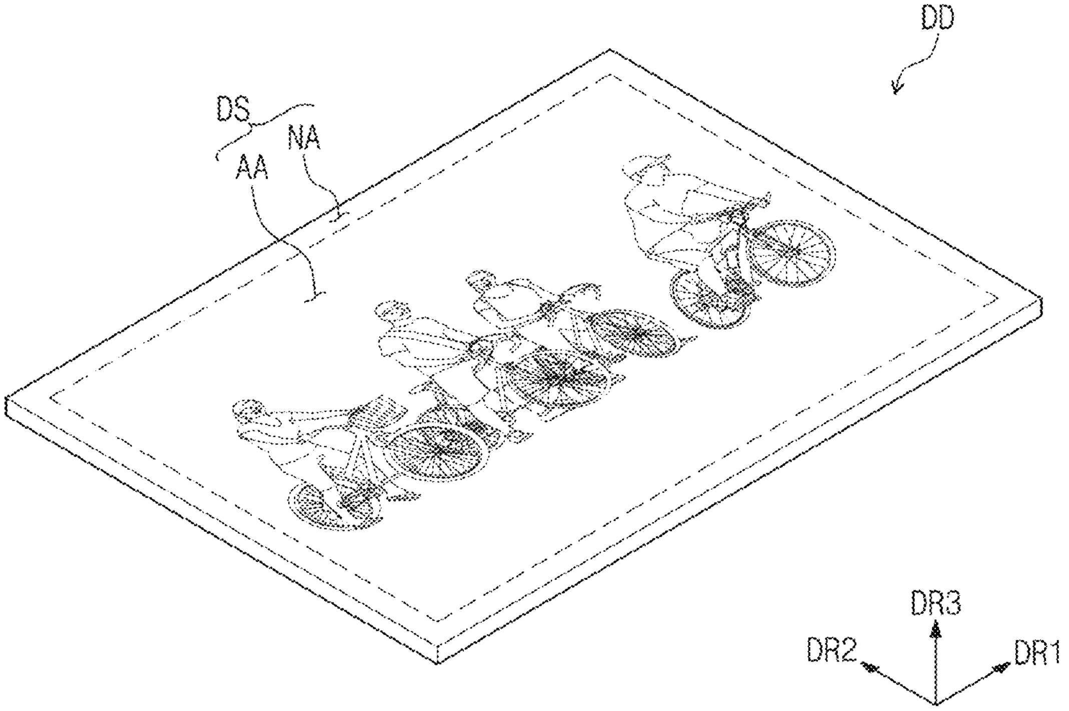
FIG. 1 is a perspective view of a display device, according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents. "Or" means "and/or." As used herein, the term "and/or" includes any and all combinations of one or more of the associated listed items.

Although the terms "first", "second", etc. may be used to describe various components, the components should not be construed as being limited by the terms. The terms are only used to distinguish one component from another component. For example, without departing from the scope and spirit of the disclosure, a first component may be referred to as a second component, and similarly, the second component may be referred to as the first component.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an.".

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described with reference to the accompanying drawings.

FIG. 1 is a perspective view of a display device, according to an embodiment of the disclosure.

Referring to FIG. 1, an embodiment of a display device DD may have a surface on a plane defined by a first direction DR1 and a second direction DR2. The display device DD may have a shape of a rectangle having long sides in the first direction DR1 and short sides in the second direction DR2. However, this is an example, and a shape of the display device DD according to an embodiment of the disclosure is not limited thereto. In an alternative embodiment, for example, the display device DD may have various shapes such as a circle or a polygon.

An upper surface of the display device DD may be defined as a display surface DS. The display surface DS may be on a plane defined by the first direction DR1 and the second direction DR2. An image generated by the display device DD may be provided to a user through the display surface DS.

The display surface DS may include an active area AA and a peripheral area NA adjacent to the active area AA.

The active area AA may display an image. The normal direction (i.e., the thickness direction of a display panel DP) of the active area AA may be defined as a third direction DR3. The third direction DR3 may be a thickness direction of the display device DD. A front surface (or an upper surface) and a back surface (or a lower surface) of each member may be identified by the third direction DR3. "On a plane" or "in a plan view" may mean "when viewed in the third direction DR3".

The peripheral area NA may not display an image. The peripheral area NA may surround the active area AA and may define a border of the display device DD printed in a predetermined color. However, an embodiment is not limited thereto. In an embodiment, for example, a shape of the active area AA and a shape of the peripheral area NA may be designed to be relative to each other. In an embodiment of the disclosure, the peripheral area NA may be omitted.

The display device DD may be used for a large electronic device such as a television, a monitor, or an outer billboard. Moreover, the display device DD may be used for small and medium electronic devices such as a personal computer, a notebook computer, a personal digital terminal, an automotive navigation system, a game console, a smartphone, a tablet, or a camera. However, the above examples are provided only as an embodiment, and it will be understood that the display device DD may be applied to any other electronic device(s) without departing from the concept of the disclosure.

Figure 2:
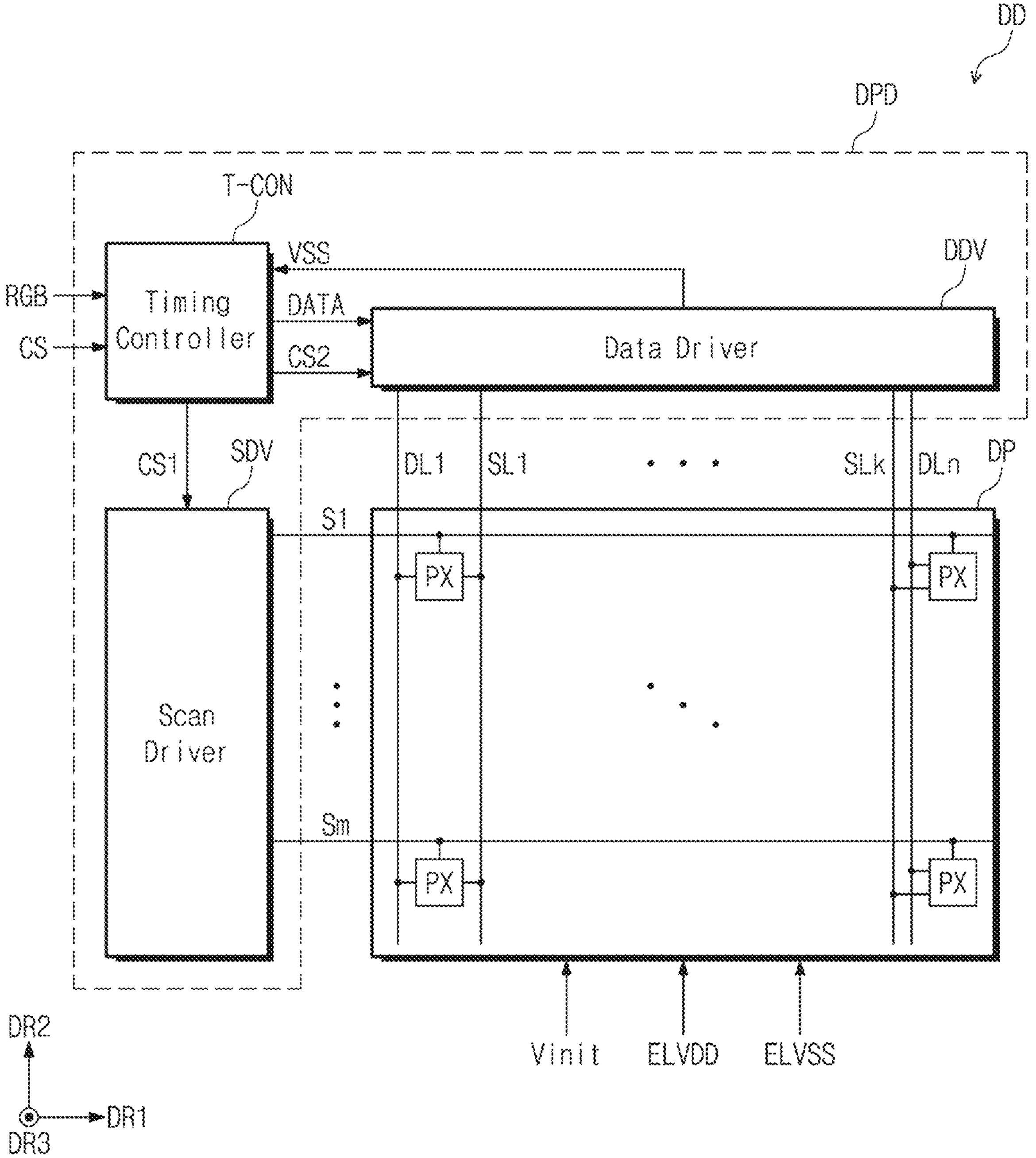
FIG. 2 is a block diagram of a display device, according to an embodiment of the disclosure.

FIG. 2 is a block diagram of a display device, according to an embodiment of the disclosure.

Referring to FIG. 2, an embodiment of the display device DD may include the display panel DP and a display panel driving circuit DPD. The display panel driving circuit DPD may include a scan driver SDV, a data driver DDV, and a timing controller T-CON. The display panel DP may include a plurality of pixels PX, a plurality of scan lines S1 to Sm, a plurality of data lines DL1 to DLn, and a plurality of sensing lines SL1 to SLk. Each of 'm', 'n', and 'k' is a natural number.

The display panel DP according to an embodiment of the disclosure may be a light emitting display panel, but is not particularly limited thereto. In an embodiment, for example, the display panel DP may be an organic light emitting display panel, an inorganic light emitting display panel, a micro-light emitting diode (LED) display panel, or a nano-LED display panel. A light emitting element of the organic light emitting display panel may include an organic light emitting material. A light emitting element of the inorganic light emitting display panel may include a quantum dot, a quantum rod, or the like. The light emitting element of the micro-LED display panel may include a micro-LED. The light emitting element of the nano-LED display panel may include a nano-LED.

The plurality of scan lines S1 to Sm may be connected to the plurality of pixels PX and the scan driver SDV. Each of the plurality of scan lines S1 to Sm may extend in the first direction DR1. The plurality of scan lines S1 to Sm may be spaced from each other in the second direction DR2.

The plurality of data lines DL1 to DLn may be connected to the plurality of pixels PX and the data driver DDV. Each of the plurality of data lines DL1 to DLn may extend in the second direction DR2. The plurality of data lines DL1 to DLn may be spaced from each other in the first direction DR1.

The plurality of sensing lines SL1 to SLk may be connected to the plurality of pixels PX and the data driver DDV. Each of the plurality of sensing lines SL1 to SLk may extend in the second direction DR2. The plurality of sensing lines SL1 to SLk may be spaced from each other in the first direction DR1.

A first voltage ELVDD, a second voltage ELVSS, and an initialization voltage Vinit may be applied to the display panel DP. The second voltage ELVSS may have a lower level than the first voltage ELVDD. The first voltage ELVDD, the second voltage ELVSS, and the initialization voltage Vinit may be applied to the plurality of pixels PX.

The timing controller T-CON may receive image signals RGB and a control signal CS from an outside (e.g., a system board). The timing controller T-CON may generate pieces of image data DATA by converting data formats of the image signals RGB to be suitable for an interface specification with the data driver DDV. The timing controller T-CON may provide the data driver DDV with the pieces of image data DATA, of which data formats are converted.

The timing controller T-CON may generate and output a first control signal CS1 and a second control signal CS2 in response to the control signal CS provided from the outside. The first control signal CS1 may be defined as a scan control signal. The second control signal CS2 may be defined as a data control signal. The first control signal CS1 may be provided to the scan driver SDV. The second control signal CS2 may be provided to the data driver DDV.

The scan driver SDV may generate a plurality of scan signals in response to the first control signal CS1. The plurality of scan signals may be applied to the plurality of pixels PX through the plurality of scan lines S1 to Sm.

The data driver DDV may generate a plurality of data voltages corresponding to pieces of image data DATA in response to the second control signal CS2. The plurality of data voltages may be applied to the plurality of pixels PX through the data lines DL1 to DLn.

The plurality of pixels PX may receive the plurality of data voltages in response to the plurality of scan signals. The plurality of pixels PX may display images by emitting light of luminance corresponding to the plurality of data voltages.

The data driver DDV may sense a sensing voltage VSS in the plurality of pixels PX. The sensing voltage VSS may be provided to the timing controller T-CON. The timing controller T-CON may compensate for the pieces of image data DATA applied to the plurality of pixels PX based on the sensing voltage VSS. This will be described later.

Figure 3:
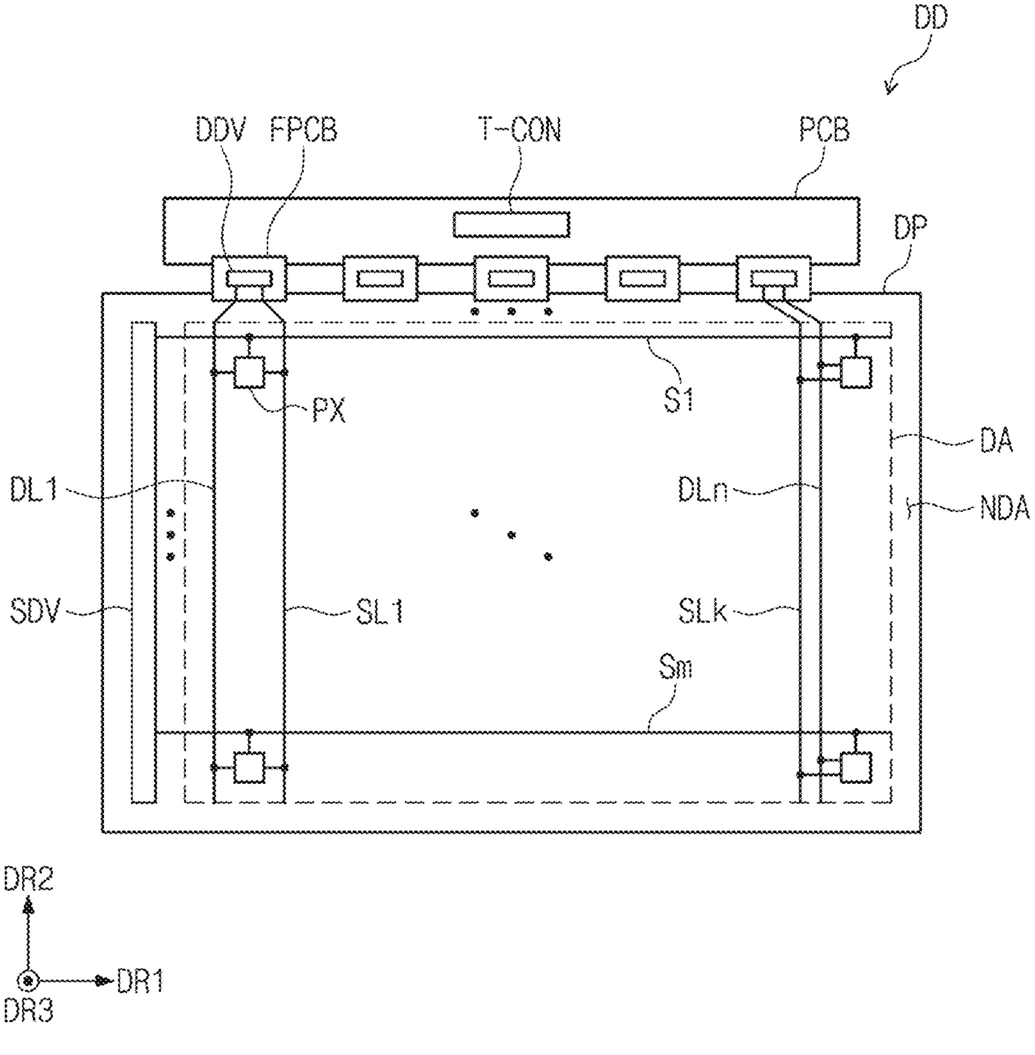
FIG. 3 is a plan view of a display device, according to an embodiment of the disclosure.

FIG. 3 is a plan view of a display device, according to an embodiment of the disclosure. In the description of FIG. 3, the same reference numerals are assigned to the same components described with reference to FIG. 2, and thus any repetitive detailed descriptions thereof will be omitted to avoid redundancy.

Referring to FIG. 3, an embodiment of the display device DD may include the display panel DP, the scan driver SDV, the data driver DDV, a plurality of flexible printed circuit boards FPCB, the timing controller T-CON, and a printed circuit board PCB.

A display area DA and a non-display area NDA surrounding the display area DA may be defined in the display panel DP. In an embodiment, as shown in FIG. 3, the display panel DP may have a rectangular shape having long sides extending in the first direction DR1 and short sides extending in the second direction DR2. However, the shape of the display panel DP is not limited thereto.

The pixels PX may be positioned in the display area DA. The scan driver SDV may be arranged in the non-display area NDA adjacent to one of the short sides of the display panel DP. The plurality of data drivers DDV may be provided, that is, the data driver DDV may be provided in plural. The data drivers DDV may be arranged adjacent to an upper side of the display panel DP, which is defined as one of long sides of the display panel DP.

The printed circuit board PCB may be arranged adjacent to the upper side of the display panel DP. The printed circuit board PCB may be connected to the display panel DP through the flexible printed circuit boards FPCB. The flexible printed circuit boards FPCB may be connected to the upper side of the display panel DP and to the printed circuit board PCB. The plurality of data drivers DDV may be respectively mounted on the flexible printed circuit boards FPCB. Each of the plurality of data drivers DDV may include a readout chip. The readout chip may be manufactured and provided in a form of an integrated circuit chip. The readout chip may simultaneously perform a function of outputting data voltage to the display panel DP and a function of receiving a sensing signal from the display panel DP.

The plurality of data lines DL1 to DLn may extend to the flexible printed circuit board FPCB and connected to the plurality of data drivers DDV. In FIG. 3, only two data lines DL1 and DLn respectively arranged on the leftmost and rightmost sides and connected to the data drivers DDV are shown for convenience of illustration. However, a plurality of data lines may be connected to each of the data drivers DDV.

The timing controller T-CON may be manufactured in a form of an integrated circuit chip and mounted on the printed circuit board PCB.

Figure 4:
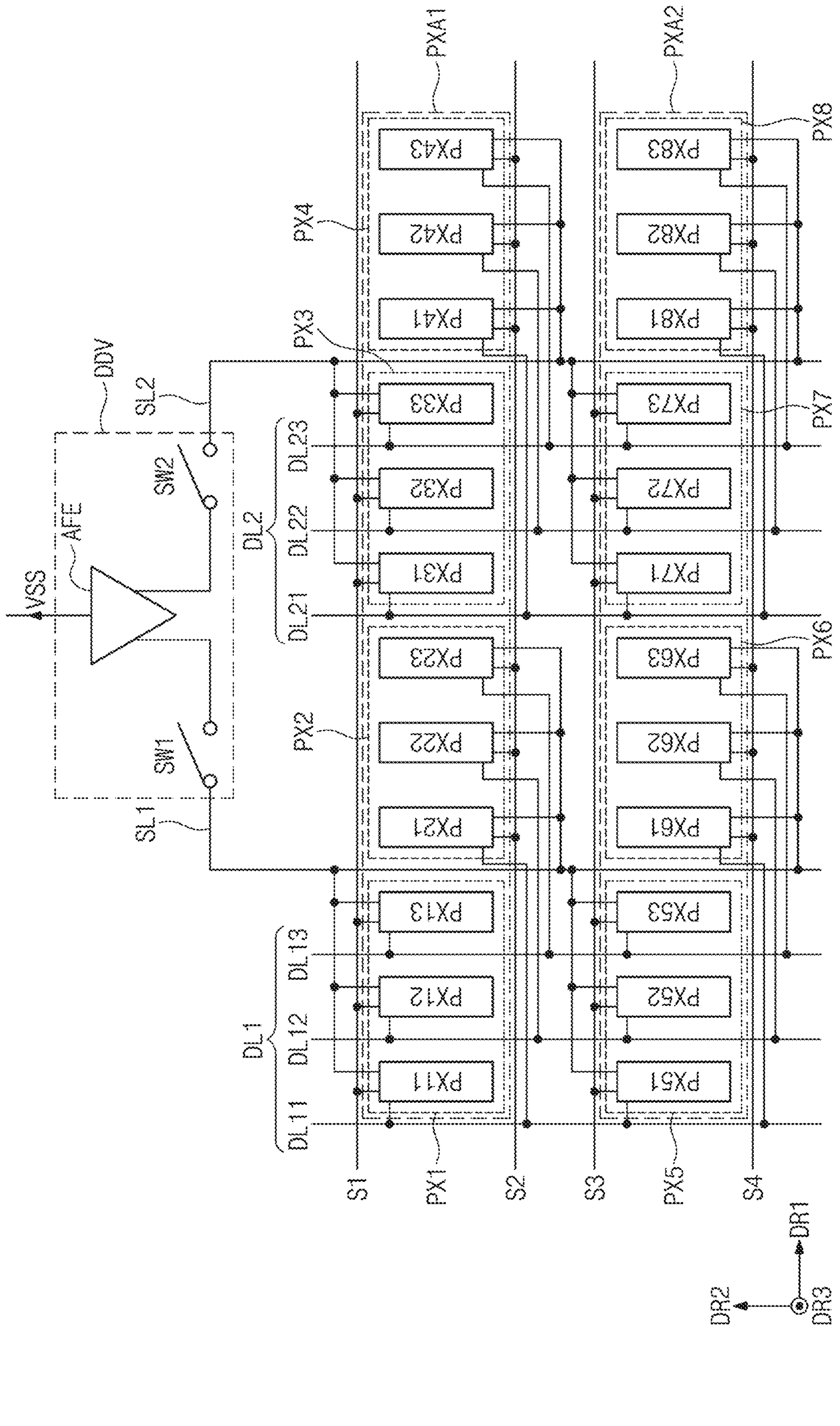
FIG. 4 is a conceptual diagram illustrating a display device, according to an embodiment of the disclosure.

FIG. 4 is a conceptual diagram illustrating a display device, according to an embodiment of the disclosure.

Referring to FIGS. 3 and 4, an embodiment of the display panel DP may include a plurality of pixel rows, each of which includes the plurality of pixels PX arranged in the first direction DR1. FIG. 4 shows a first pixel row PXA1 and a second pixel row PXA2.

The first pixel row PXA1 may include a first pixel PX1, a second pixel PX2, a third pixel PX3, and a fourth pixel PX4, which are arranged in the first direction DR1. FIG. 4 illustrates four pixels among the plurality of pixels PX included in the first pixel row PXA1. However, the number of pixels included in the first pixel row PXA1 according to an embodiment of the disclosure is not limited thereto.

The first pixel PX1 may include a first sub-pixel PX11, a second sub-pixel PX12, and a third sub-pixel PX13, which are arranged in the first direction DR1. The first sub-pixel PX11 of the first pixel PX1 may be a pixel that emits first light. The first light may be red light. The second sub-pixel PX12 of the first pixel PX1 may be a pixel that emits second light different from the first light. The second light may be green light. The third sub-pixel PX13 of the first pixel PX1 may be a pixel that emits third light different from the first light and the second light. The third light may be blue light.

The second pixel PX2 may be spaced from the first pixel PX1 in the first direction DR1. The second pixel PX2 may include a first sub-pixel PX21, a second sub-pixel PX22, and a third sub-pixel PX23, which are arranged in the first direction DR1. The first sub-pixel PX21 of the second pixel PX2 may be a pixel that emits the first light. The second sub-pixel PX22 of the second pixel PX2 may be a pixel that emits the second light. The third sub-pixel PX23 of the second pixel PX2 may be a pixel that emits the third light.

The third pixel PX3 may be spaced from the second pixel PX2 in the first direction DR1. The third pixel PX3 may include a first sub-pixel PX31, a second sub-pixel PX32, and a third sub-pixel PX33, which are arranged in the first direction DR1. The first sub-pixel PX31 of the third pixel PX3 may be a pixel that emits the first light. The second sub-pixel PX32 of the third pixel PX3 may be a pixel that emits the second light. The third sub-pixel PX33 of the third pixel PX3 may be a pixel that emits the third light.

The fourth pixel PX4 may be spaced from the third pixel PX3 in the first direction DR1. The fourth pixel PX4 may include a first sub-pixel PX41, a second sub-pixel PX42, and a third sub-pixel PX43, which are arranged in the first direction DR1. The first sub-pixel PX41 of the fourth pixel PX4 may be a pixel that emits the first light. The second sub-pixel PX42 of the fourth pixel PX4 may be a pixel that emits the second light. The third sub-pixel PX43 of the fourth pixel PX4 may be a pixel that emits the third light.

The second pixel row PXA2 may be spaced from the first pixel row PXA1 in the second direction DR2. The second pixel row PXA2 may include a fifth pixel PX5, a sixth pixel PX6, a seventh pixel PX7, and an eighth pixel PX8, which are arranged in the first direction DR1. FIG. 4 illustrates four pixels among the plurality of pixels PX included in the second pixel row PXA2. However, the number of pixels included in the second pixel row PXA2 according to an embodiment of the disclosure is not limited thereto.

The fifth pixel PX5 may be spaced from the first pixel PX1 in the second direction DR2. The fifth pixel PX5 may include a first sub-pixel PX51, a second sub-pixel PX52, and a third sub-pixel PX53, which are arranged in the first direction DR1. The first sub-pixel PX51 of the fifth pixel PX5 may be a pixel that emits the first light. The second sub-pixel PX52 of the fifth pixel PX5 may be a pixel that emits the second light. The third sub-pixel PX53 of the fifth pixel PX5 may be a pixel that emits the third light.

The sixth pixel PX6 may be spaced from the second pixel PX2 in the second direction DR2. The sixth pixel PX6 may include a first sub-pixel PX61, a second sub-pixel PX62, and a third sub-pixel PX63, which are arranged in the first direction DR1. The first sub-pixel PX61 of the sixth pixel PX6 may be a pixel that emits the first light. The second sub-pixel PX62 of the sixth pixel PX6 may be a pixel that emits the second light. The third sub-pixel PX63 of the sixth pixel PX6 may be a pixel that emits the third light.

The seventh pixel PX7 may be spaced from the third pixel PX3 in the second direction DR2. The seventh pixel PX7 may include a first sub-pixel PX71, a second sub-pixel PX72, and a third sub-pixel PX73, which are arranged in the first direction DR1. The first sub-pixel PX71 of the seventh pixel PX7 may be a pixel that emits the first light. The second sub-pixel PX72 of the seventh pixel PX7 may be a pixel that emits the second light. The third sub-pixel PX73 of the seventh pixel PX7 may be a pixel that emits the third light.

The eighth pixel PX8 may be spaced from the fourth pixel PX4 in the second direction DR2. The eighth pixel PX8 may include a first sub-pixel PX81, a second sub-pixel PX82, and a third sub-pixel PX83, which are arranged in the first direction DR1. The first sub-pixel PX81 of the eighth pixel PX8 may be a pixel that emits the first light. The second sub-pixel PX82 of the eighth pixel PX8 may be a pixel that emits the second light. The third sub-pixel PX83 of the eighth pixel PX8 may be a pixel that emits the third light.

The first scan line S1 may extend in the first direction DR1. The first scan line S1 may be electrically connected to (2n−1)-th pixels ('n' is a positive integer) among the plurality of pixels PX1, PX2, PX3, and PX4 of the first pixel row PXA1. Here, the (2n−1)-th pixels may mean pixels in odd-numbered pixel columns. In an embodiment, for example, the first scan line S1 may be electrically connected to the first pixel PX1 and the third pixel PX3.

The second scan line S2 may extend in the first direction DR1. The second scan line S2 may be spaced from the first scan line S1 in the second direction DR2. The second scan line S2 may be electrically connected to 2n-th pixels among the plurality of pixels PX1, PX2, PX3, and PX4 of the first pixel row PXA1. Here, the 2n−th pixels may mean pixels in even-numbered pixel columns. In an embodiment, for example, the second scan line S2 may be electrically connected to the second pixel PX2 and the fourth pixel PX4.

The third scan line S3 may extend in the first direction DR1. The third scan line S3 may be spaced from the second scan line S2 in the second direction DR2. The third scan line S3 may be electrically connected to (2n−1)-th pixels among the plurality of pixels PX5, PX6, PX7, and PX8 of the second pixel row PXA2. In an embodiment, for example, the third scan line S3 may be electrically connected to the fifth pixel PX5 and the seventh pixel PX7.

The fourth scan line S4 may extend in the first direction DR1. The fourth scan line S4 may be spaced from the third scan line S3 in the second direction DR2. The fourth scan line S4 may be electrically connected to 2n-th pixels among the plurality of pixels PX5, PX6, PX7, and PX8 of the second pixel row PXA2. In an embodiment, for example, the fourth scan line S4 may be electrically connected to the sixth pixel PX6 and the eighth pixel PX8.

The first data line DL1 may extend in the second direction DR2. The first data line DL1 may be electrically connected to two pixels adjacent to each other in each of the plurality of pixel rows PXA1 and PXA2. The first data line DL1 may be electrically connected to the first pixel PX1, the second pixel PX2, the fifth pixel PX5, and the sixth pixel PX6.

According to an embodiment of the disclosure, one data line may be electrically connected to two adjacent pixels in each of a plurality of pixel rows. As compared to a case where one data line is electrically connected to one pixel in each of a plurality of pixel rows, the number of data lines DL1 to DLn output from the data driver DDV may be relatively small. The number of data lines DL1 to DLn connected to the data driver DDV may be reduced, and the size of the data driver DDV may be reduced. Accordingly, an area size of the peripheral area NA (see FIG. 1) of the display device DD (see FIG. 1) may be reduced.

The first data line DL1 may include a first sub-data line DL11, a second sub-data line DL12, and a third sub-data line DL13, which are arranged in the first direction DR1.

The first sub-data line DL11 may be electrically connected to the first sub-pixels PX11, PX21, PX51, and PX61 of the first, second, fifth and sixth pixels PX1, PX2, PX5 and PX6. The second sub-data line DL12 may be electrically connected to the second sub-pixels PX12, PX22, PX52, and PX62 of the first, second, fifth and sixth pixels PX1, PX2, PX5 and PX6. The third sub-data line DL13 may be electrically connected to the third sub-data pixels PX13, PX23, PX53, and PX63 of the first, second, fifth and sixth pixels PX1, PX2, PX5 and PX6.

The second data line DL2 may extend in the second direction DR2. The second data line DL2 may be spaced from the first data line DL1 in the first direction DR1. The second data line DL2 may be electrically connected to two other pixels adjacent to each other in each of the plurality of pixel rows PXA1 and PXA2. The second data line DL2 may be electrically connected to the third pixel PX3, the fourth pixel PX4, the seventh pixel PX7, and the eighth pixel PX8.

The second data line DL2 may include a first sub-data line DL21, a second sub-data line DL22, and a third sub-data line DL23, which are arranged in the first direction DR1.

The first sub-data line DL21 may be electrically connected to the first sub-pixels PX31, PX41, PX71, and PX81 of the third, fourth, seventh and eighth pixels PX3, PX4, PX7 and PX8. The second sub-data line DL22 may be electrically connected to the second sub-pixels PX32, PX42, PX72, and PX82 of the third, fourth, seventh and eighth pixels PX3, PX4, PX7 and PX8. The third sub-data line DL23 may be electrically connected to the third sub-data pixels PX33, PX43, PX73, and PX83 of the third, fourth, seventh and eighth pixels PX3, PX4, PX7 and PX8.

The first sensing line SL1 may extend in the second direction DR2. The first sensing line SL1 may be spaced from the first data line DL1 in the first direction DR1. The first sensing line SL1 may be positioned between the first data line DL1 and the second data line DL2. The first sensing line SL1 may be positioned between two adjacent pixel columns. The first sensing line SL1 may be electrically connected to two pixels adjacent to each other in each of the plurality of pixel rows PXA1 and PXA2. The first sensing line SL1 may be electrically connected to the first pixel PX1, the second pixel PX2, the fifth pixel PX5, and the sixth pixel PX6.

The second sensing line SL2 may extend in the second direction DR2. The second sensing line SL2 may be spaced from the second data line DL2 in the first direction DR1. The second sensing line SL2 may be positioned between two adjacent pixel columns. The second sensing line SL2 may be electrically connected to two other pixels adjacent to each other in each of a plurality of pixel rows PXA1 and PXA2. The second sensing line SL2 may be electrically connected to the third pixel PX3, the fourth pixel PX4, the seventh pixel PX7, and the eighth pixel PX8.

The first sensing line SL1 and the second sensing line SL2 may be electrically connected to the data driver DDV. The data driver DDV may include a first switch SW1, a second switch SW2, and an analog front end AFE.

The first switch SW1 may be connected to the first sensing line SL1.

The second switch SW2 may be connected to the second sensing line SL2.

The analog front end AFE may be connected to the first switch SW1 and the second switch SW2. The analog front end AFE may output the sensing voltage VSS. The sensing voltage VSS may be provided to the timing controller T-CON.

Figure 5:
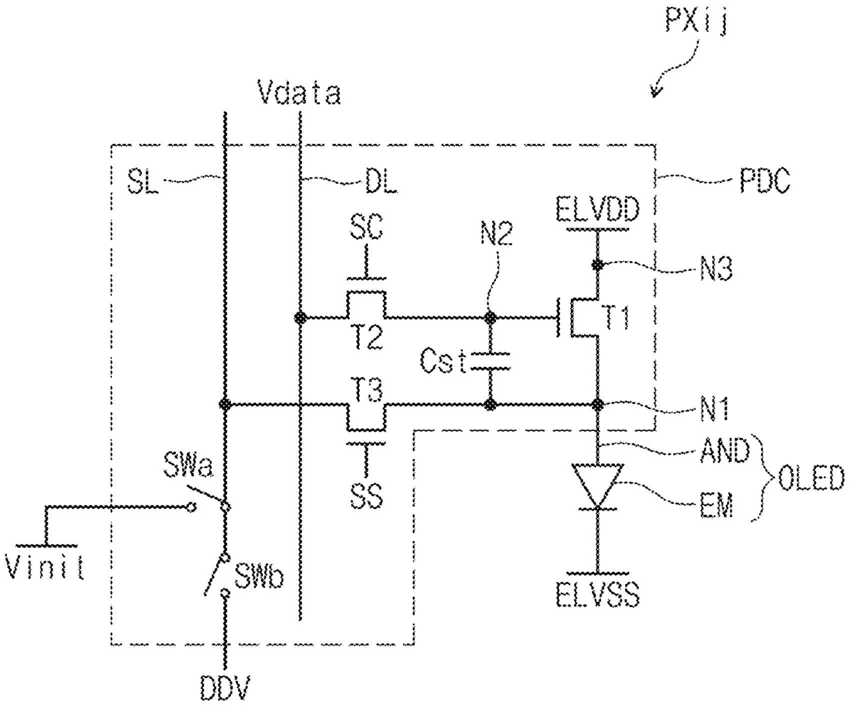
FIG. 5 is an equivalent circuit diagram of a sub-pixel, according to an embodiment of the disclosure.

FIG. 5 is an equivalent circuit diagram of a sub-pixel, according to an embodiment of the disclosure.

FIG. 5 illustrates an equivalent circuit diagram of a sub-pixel PXij included in each of the plurality of pixels PX (see FIG. 3). Here, each of 'i' and 'j' may be a positive integer.

Referring to FIG. 5, the sub-pixel PXij may include a pixel driving circuit PDC and a light emitting diode OLED.

For example, the pixel driving circuit PDC according to an embodiment of the disclosure may include three transistors and one capacitor. In this way, the sub-pixel PXij including three transistors and one capacitor may be referred to as "having a 3T1C structure". However, this is an example and the number of transistors and the number of capacitors of the pixel driving circuit PDC according to an embodiment of the disclosure is not limited thereto.

The pixel driving circuit PDC may include a driving transistor T1, a switching transistor T2, a sensing transistor T3, a capacitor Cst, and a sensing line SL.

The light emitting diode OLED may operate in an on state or off state. The light emitting diode OLED may include a first electrode AND, a light emitting element EM, and a second electrode. The first electrode AND may be referred to as the "anode AND". The second electrode may be referred to as a "cathode".

The first electrode AND may be electrically connected to a source node or drain node of the driving transistor T1. The second voltage ELVSS may be provided to the second electrode.

The driving transistor T1 may supply a driving current to the light emitting diode OLED to drive the light emitting diode OLED.

The driving transistor T1 may have a first node N1 corresponding to a source node or drain node, a second node N2 corresponding to a gate node, and a third node N3 corresponding to a drain node or source node. FIG. 5 illustrates the driving transistor T1 where the first node N1 is a source node, the second node N2 is a gate node, and the third node N3 is a drain node.

The first node N1 may be electrically connected to the first electrode AND of the light emitting diode OLED. The first voltage ELVDD may be provided to the third node N3.

The switching transistor T2 may be a transistor for delivering a data voltage Vdata to the second node N2. The switching transistor T2 may be controlled by the scan signal SC provided to the gate node, and may be electrically connected between the second node N2 and the data line DL. The data line DL may be one of the plurality of data lines DL1 to DLn (see FIG. 3) of FIG. 3.

The capacitor Cst may be electrically connected between the first node N1 and the second node N2 of the driving transistor T1. The capacitor Cst may be referred to as the "storage capacitor Cst". The capacitor Cst may maintain a constant voltage during one frame time.

The sensing transistor T3 may be controlled by the sensing signal SS provided to the gate node, and may be electrically connected between the sensing line SL and the first node N1. The sensing line SL may be one of the plurality of sensing lines SL1 to SLk shown in FIG. 3.

The sensing transistor T3 may be turned on to provide the initialization voltage Vinit supplied through the sensing line SL to the first node N1 of the driving transistor T1.

In addition, the sensing transistor T3 may allow the data driver DDV electrically connected to the sensing line SL to sense the voltage of the first node N1 of the driving transistor T1.

The sensing transistor T3 may be a transistor related to a compensation function for a unique characteristic value of the driving transistor T1. The unique characteristic value of the driving transistor T1 may include, for example, a threshold voltage (Vth), mobility, or the like.

A source following operation in which a voltage (Vs) of the first node N1 follows a voltage (Vg) of the second node N2 may be performed by using the sensing transistor T3 by sensing the unique characteristic value of the driving transistor T1 of each of the plurality of pixels PX (see FIG. 3), and the sensing transistor T3 may sense the voltage of the first node N1 of the driving transistor T1 as a sensing voltage. A change in a threshold voltage of the driving transistor T1 may be sensed based on the sensing voltage thus sensed at this time.

According to an embodiment of the disclosure, the unique characteristic value (a threshold voltage or mobility) of the driving transistor T1 may be sensed by the sensing transistor T3 of the sub-pixel PXij. The data driver DDV may compensate for the unique characteristic value. The luminance uniformity of the plurality of pixels PX (see FIG. 3) may be improved by compensating for the unique characteristic value between the driving transistors T1. Accordingly, the display device DD (see FIG. 1) with improved display quality may be provided.

The pixel driving circuit PDC may be electrically connected to the data driver DDV.

The pixel driving circuit PDC may further include a first pixel switch SWa and a second pixel switch SWb.

The first pixel switch SWa may electrically connect the sensing line SL and a supply node of the initialization voltage Vinit to each other in response to a first switching signal.

The second pixel switch SWb may electrically connect the sensing line SL and the data driver DDV to each other in response to a second switching signal.

When the first pixel switch SWa is turned off and the second pixel switch SWb is turned on, the sensing line SL and the data driver DDV may be connected to each other such that the data driver DDV is capable of sensing the voltage of the sensing line SL.

Figure 6:
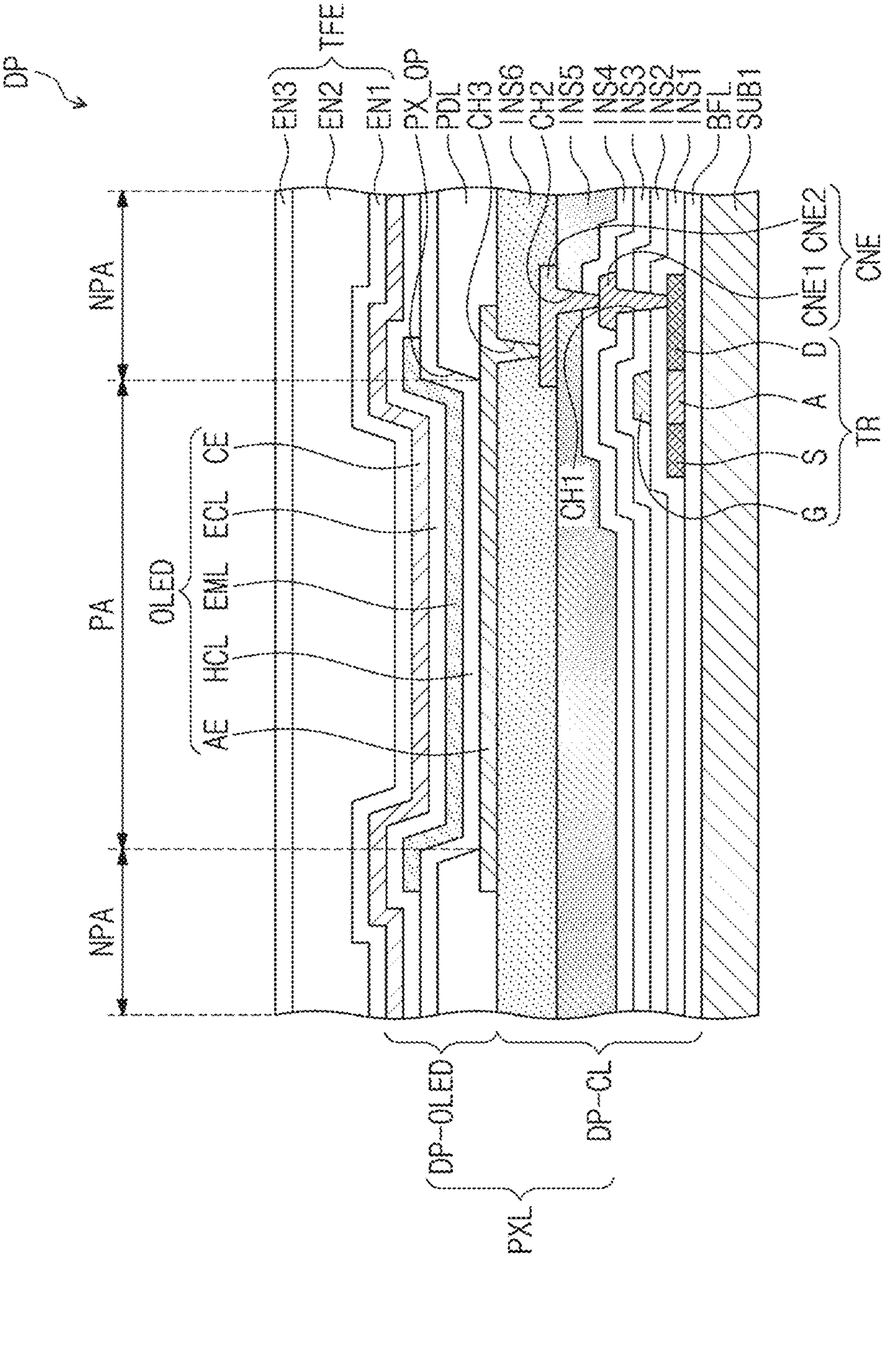
FIG. 6 is a cross-sectional view of a portion of a display panel, according to an embodiment of the disclosure.

FIG. 6 is a cross-sectional view of a portion of a display panel, according to an embodiment of the disclosure.

Referring to FIGS. 5 and 6, an embodiment of the display panel DP may include a first substrate SUB1, a pixel layer PXL, and a thin film encapsulation layer TFE.

The pixel layer PXL may be disposed on the first substrate SUB1. The pixel layer PXL may include a circuit element layer DP-CL and a display element layer DP-OLED.

The circuit element layer DP-CL may include a buffer layer BFL, first to sixth insulating layers INS1 to INS6, a transistor TR, and a connection electrode CNE.

The buffer layer BFL may be disposed on the first substrate SUB1. The buffer layer BFL may be an inorganic layer. A semiconductor pattern may be disposed on the buffer layer BFL. The semiconductor pattern may include polysilicon, amorphous silicon, or metal oxide.

The semiconductor pattern may be doped with an N-type dopant or a P-type dopant. The semiconductor pattern may include a highly-doped area and a lightly-doped area. Conductivity of the highly-doped area may be greater than that of the lightly-doped area. The highly-doped area may substantially operate as a source electrode or a drain electrode of the transistor TR. The lightly-doped area may substantially correspond to an active (or channel) of a transistor.

A source S, an active A, and a drain D of the transistor TR may be formed from (or defined by portions of) the semiconductor pattern. The first insulating layer INS1 may be disposed on the semiconductor pattern. A gate G of the transistor TR may be disposed on the first insulating layer INS1. The second insulating layer INS2 may be disposed on the gate G. The third insulating layer INS3 may be disposed on the second insulating layer INS2.

The transistor TR may refer to the driving transistor T1 shown in FIG. 5.

The connection electrode CNE may connect the transistor TR to the light emitting diode OLED. The connection electrode CNE may include a first connection electrode CNE1 and a second connection electrode CNE2. The first connection electrode CNE1 may be disposed on the third insulating layer INS3 and may be connected to the drain D through a first contact hole CH1 defined in the first to third insulating layers INS1 to INS3.

The fourth insulating layer INS4 may be disposed on the first connection electrode CNE1. The fifth insulating layer INS5 may be disposed on the fourth insulating layer INS4. The second connection electrode CNE2 may be disposed on the fifth insulating layer INS5. The second connection electrode CNE2 may be connected to the first connection electrode CNE1 through a second contact hole CH2 defined in the fourth and fifth insulating layers INS4 and INS5.

The sixth insulating layer INS6 may be disposed on the second connection electrode CNE2. The first to sixth insulating layers INS1 to INS6 may be inorganic layers or organic layers.

The display element layer DP-OLED may be disposed on the circuit element layer DP-CL. The display element layer DP-OLED may include a light emitting diode OLED and a pixel defining layer PDL.

The light emitting diode OLED may include a first electrode AE (or an anode), a second electrode CE (or a cathode), a hole control layer HCL, an electron control layer ECL, and a light emitting layer EML.

The first electrode AE may be disposed on the sixth insulating layer INS6. The first electrode AE may be connected to the second connection electrode CNE2 through a third contact hole CH3 defined in the sixth insulating layer INS6. A pixel defining layer PDL, in which an opening PX OP for exposing a predetermined portion of the first electrode AE is defined, may be disposed on the first electrode AE and the sixth insulating layer INS6.

The hole control layer HCL may be disposed on the first electrode AE and the pixel defining layer PDL. The hole control layer HCL may include a hole transport layer and a hole injection layer.

The light emitting layer EML may be disposed on the hole control layer HCL. The light emitting layer EML may be disposed in an area corresponding to an opening PX OP. The light emitting layer EML may include the light emitting element EM. The light emitting element EM may include an organic material and/or an inorganic material. The light emitting layer EML may generate blue light.

The electron control layer ECL may be disposed on the light emitting layer EML and the hole control layer HCL. The electron control layer ECL may include an electron transport layer and an electron injection layer. The hole control layer HCL and the electron control layer ECL may be disposed in common in an emission area PA and a non-emission area NPA.

The second electrode CE may be disposed on the electron control layer ECL. The second electrode CE may be disposed in the pixels PX in common.

The thin film encapsulation layer TFE may be disposed on the second electrode CE to cover the pixel PX. The thin film encapsulation layer TFE may include a first encapsulation layer EN1 disposed on the second electrode CE, a second encapsulation layer EN2 disposed on the first encapsulation layer EN1, and a third encapsulation layer EN3 disposed on the second encapsulation layer EN2. Each of the first and third encapsulation layers EN1 and EN3 may include an inorganic insulating layer, and may protect the pixel PX from moisture/oxygen. The second encapsulation layer EN2 includes an organic insulating layer and may protect the pixel PX from foreign objects such as dust particles.

The first voltage ELVDD may be applied to the first electrode AE through the transistor TR, and the second voltage ELVSS may be applied to the second electrode CE. Excitons may be formed by coupling holes and electrons injected into the light emitting layer EML. As the excitons transition to a ground state, the light emitting diode OLED may emit light.

The emission area PA and the non-emission area NPA around the emission area PA may be defined in a planar area of the display panel DP. The light emitting diode OLED may be positioned in the emission area PA.

Figure 7:
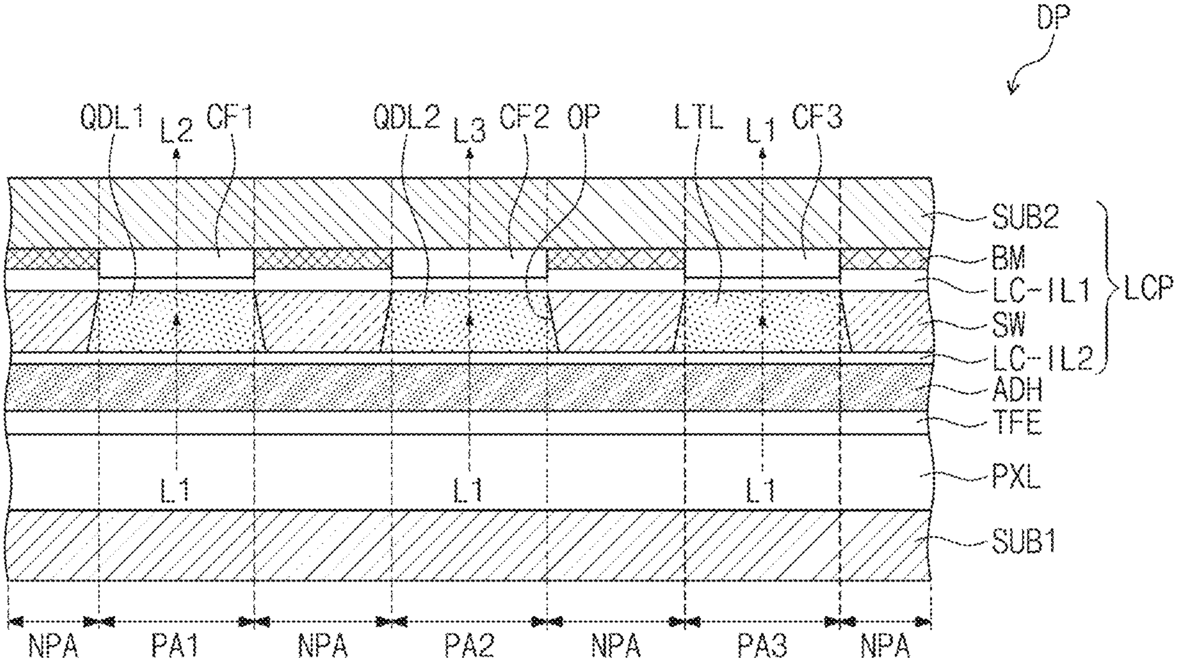
FIG. 7 is a plan view of a display panel, according to an embodiment of the disclosure.

FIG. 7 is a plan view of a display panel, according to an embodiment of the disclosure. In the description of FIG. 7, the same reference numerals are assigned to the same components described with reference to FIG. 6, and thus any repetitive detailed descriptions thereof will be omitted to avoid redundancy.

FIG. 7 illustrates first, second, and third emission areas PA1, PA2, and PA3. The emission area PA shown in FIG. 6 may be one of first, second, and third emission areas PA1, PA2, and PA3. 35or convenience of illustration and description, in FIG. 7, cross-sectional structures of the transistor TR and the light emitting diode OLED shown in FIG. 6 are omitted, and the pixel layer PXL is illustrated as a single layer.

Referring to FIGS. 6 and 7, an embodiment of the display panel DP may further include an adhesive layer ADH and a light control part LCP. The light control part LCP may be attached on the thin film encapsulation layer TFE by the adhesive layer ADH.

Areas between the first, second, and third emission areas PA1, PA2, and PA3 may be defined as the non-emission area NPA. The first, second, and third emission areas PA1, PA2, and PA3 may generate light L1. The light L1 may be blue light.

The light conversion part LCP may include a second substrate SUB2, first and second light control layers QDL1 and QDL2, a light transmitting layer LTL, first, second, and third color filters CF1, CF2, and CF3, a black matrix BM, a side wall layer SW, and first and second insulating layers LC-IL1 and LC-IL2. The first and second light control layers QDL1 and QDL2, the light transmitting layer LTL, the first, second, and third color filters CF1, CF2, and CF3, the black matrix BM, and the side wall layer SW may be interposed between the second substrate SUB2 and the thin film encapsulation layer TFE.

The first, second, and third color filters CF1, CF2, and CF3 and the black matrix BM may be disposed under the second substrate SUB2. The first, second, and third color filters CF1, CF2, and CF3 may overlap the first, second, and third emission areas PA1, PA2, and PA3, respectively. The black matrix BM may overlap the non-emission area NPA.

The first color filter CF1 may overlap the first emission area PA1, the second color filter CF2 may overlap the second emission area PA2, and the third color filter CF3 may overlap the third emission area PA3. The first color filter CF1 may include a red color filter. The second color filter CF2 may include a green color filter.

The third color filter CF3 may include a blue color filter. The first insulating layer LC-IL1 may be disposed under the first, second, and third color filters CF1, CF2, and CF3 and the black matrix BM. The side wall layer SW may be disposed under the first insulating layer LC-IL1.

Openings OP for disposing the first and second light control layers QDL1 and QDL2 and the light transmitting layer LTL may be defined by the side wall layer SW. The openings OP may overlap the first, second, and third emission areas PA1, PA2, and PA3. The side wall layer SW may overlap the non-emission area NPA. In an embodiment, the side wall layer SW may have a black color, but the color of the side wall layer SW is not limited thereto.

The first and second light control layers QDL1 and QDL2 and the light transmitting layer LTL may be disposed under the first insulating layer LC-IL1. The first and second light control layers QDL1 and QDL2 and the light transmitting layer LTL may be disposed in the openings OP.

The first and second light control layers QDL1 and QDL2 and the light transmitting layer LTL may overlap the first, second, and third emission areas PA1, PA2, and PA3, respectively, in a plan view. The first light control layer QDL1 may overlap the first emission area PA1, the second light control layer QDL2 may overlap the second emission area PA2, and the light transmitting layer LTL may overlap the third emission area PA3.

The light L1 generated in the first, second, and third emission areas PA1, PA2, and PA3 may be provided to the first and second light control layers QDL1 and QDL2 and the light transmitting layer LTL, respectively. The light L1 generated in the first emission area PA1 may be provided to the first light control layer QDL1, and the light L1 generated in the second emission area PA2 may be provided to the second light control layer QDL2. The light L1 generated in the third emission area PA3 may be provided to the light transmitting layer LTL.

The first light control layer QDL1 may convert the light L1 into first light L2. The second light control layer QDL2 may convert the light L1 into second light L3. The first light L2 may be red light, and the second light L3 may be green light. The first light control layer QDL1 may include first quantum dots (not shown). The second light control layer QDL2 may include second quantum dots (not shown). The light transmitting layer LTL may include light scattering particles (not shown) for scattering light incident thereto.

The first quantum dots may convert the light L1 having a blue wavelength band into the first light L2 having a red wavelength band. The second quantum dots may convert the light L1 having a blue wavelength band into the second light L3 having a green wavelength band. The first and second quantum dots may scatter the first light L2 and the second light L3, respectively. The light transmitting layer LTL may transmit the light L1 without performing a light conversion operation. The light transmitting layer LTL may emit light by scattering the light L1 through the light scattering particles. Here, the light L1 passed through the light transmitting layer LTL may be referred to as "third light L1".

The first light control layer QDL1 may emit the first light L2. The second light control layer QDL2 may emit the second light L3. The light transmitting layer LTL may emit the third light L1. Accordingly, a predetermined image may be displayed by the first light L2, the second light L3, and the third light L1 that respectively display red, green, and blue.

A portion of the light L1 may pass through the first light control layer QDL1 without being converted by the first quantum dots and then may be provided to the first color filter CF1. That is, the light L1 that is not converted into the first light L2 because the light L1 is not in contact with the first quantum dots may be present. The first color filter CF1 may block light of other colors. The light L1 that is not converted in the first light control layer QDL1 may be blocked by the first color filter CF1 having a red color filter, and thus may not be emitted toward the upper layer.

A portion of the light L1 may pass through the second light control layer QDL2 without being converted by the second quantum dots and then may be provided to the second color filter CF2. That is, the light L1 that is not converted into the second light L3 because the light L1 is not in contact with the second quantum dots may be present. The second color filter CF2 may block light of other colors. The light L1 that is not converted in the second light control layer QDL2 may be blocked by the second color filter CF2 having a green color filter, and thus may not be emitted toward the upper layer.

The first, second, and third color filters CF1, CF2, and CF3 may prevent reflection of the external light. In an embodiment, for example, the first, second, and third color filters CF1, CF2, and CF3 may filter the external light into red, green, and blue colors. That is, the first, second, and third color filters CF1, CF2, and CF3 may filter external light with the same color as the first light L2, the second light L3, and the third light L1, respectively. In this case, the external light may not be perceived by the user.

The black matrix BM may block undesired light in the non-emission area NPA. The side wall layer SW having black may also have a function similar to the black matrix BM, and may block undesired light in the non-emission area NPA.

Figure 8:
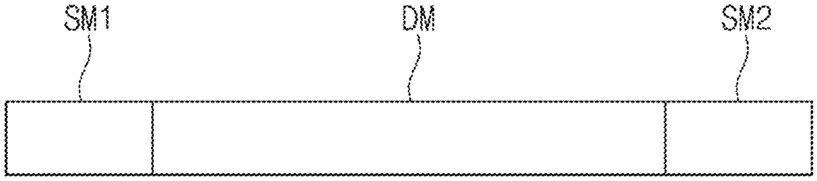
FIG. 8 illustrates driving of a display panel, according to an embodiment of the disclosure.

FIG. 8 illustrates driving of a display panel, according to an embodiment of the disclosure.

Referring to FIGS. 3, 5, and 8, the display panel DP may operate in sensing modes SM1 and SM2 and an emission mode DM. The sensing modes SM1 and SM2 may include the first sensing mode SM1 and the second sensing mode SM2. The first sensing mode SM1, the emission mode DM, and the second sensing mode SM2 may operate sequentially.

The timing controller T-CON may control the scan driver SDV and the data driver DDV based on the sensing modes SM1 and SM2 and the emission mode DM.

The first sensing mode SM1 may proceed when the display device DD is turned on. When the display device DD is turned on, the display device DD may sense a unique characteristic value (a threshold voltage or mobility) of the driving transistor T1 through the sensing transistor T3 of each of the plurality of pixels PX. The display device DD may compensate for the unique characteristic value between the driving transistors T1.

During the first sensing mode SM1, the display device DD may compensate for the unique characteristic value of the driving transistor T1 recovered (or changed) while the display device DD is turned off.

The first sensing mode SM1 may proceed during a predetermined time (i.e., a predetermined time duration). The predetermined time may be less than three seconds. The predetermined time may be determined based on a method of driving the first sensing mode SM1 according to an embodiment of the disclosure.

According to an embodiment of the disclosure, when a user turns on the display device DD, the display device DD may compensate for the plurality of pixels PX through the first sensing mode SM1. The display device DD may enter the emission mode DM from the first sensing mode SM1 after the predetermined time, and then may allow the user to quickly view an image. Accordingly, the display device DD may have improved reliability.

The emission mode DM may proceed after the first sensing mode SM1. In the emission mode DM, the plurality of pixels PX may emit light after being compensated through the first sensing mode SM1.

The second sensing mode SM2 may proceed after the emission mode DM. The second sensing mode SM2 may proceed immediately before the display device DD is turned off. During the second sensing mode SM2, the unique characteristic value of each of the plurality of pixels PX deteriorated during the emission mode DM may be compensated. Operations during the second sensing mode SM2 may be substantially the same as those during the first sensing mode SM1.

FIG. 8 shows an embodiment where the first sensing mode SM1 is provided before the emission mode DM. However, according to an embodiment of the disclosure, a period in which the display device DD operates in the first sensing mode SM1 is not limited thereto. In an alternative embodiment, for example, the emission mode DM may include an active period and a blank period, and the first sensing mode SM1 may be included in the blank period. In such an embodiment, the unique characteristic value (a threshold voltage or mobility) of the driving transistor T1 may be sensed within the emission mode DM, and the unique characteristic value between the driving transistors T1 may be compensated in real time.

Figure 9A:
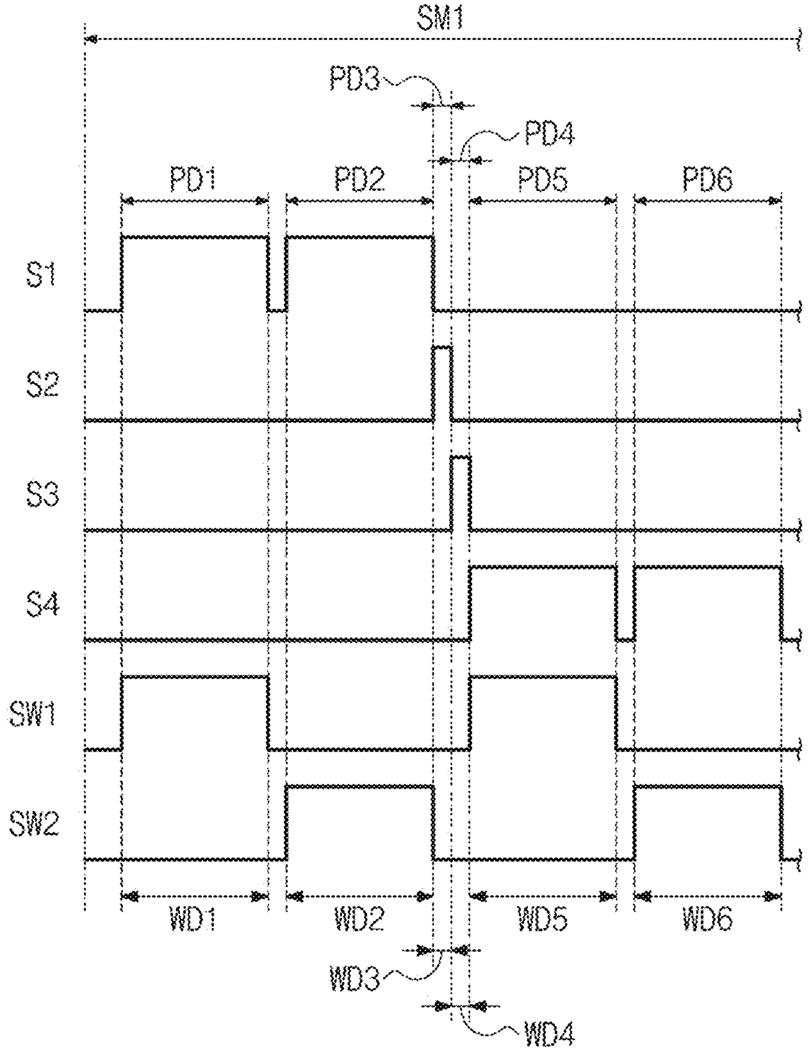
FIG. 9A is a waveform diagram of driving signals for driving pixels in a first sensing mode, according to an embodiment of the disclosure.

FIG. 9A is a waveform diagram of driving signals for driving pixels in a first sensing mode, according to an embodiment of the disclosure.

Referring to FIGS. 4 and 9A, in an embodiment, the first sensing mode SM1 may include a first period PD1, a second period PD2, a third period PD3, a fourth period PD4, a fifth period PD5, and a sixth period PD6, which are defined sequentially therein.

During the first period PD1, a first scan signal may be provided to the first scan line S1, the first switch SW1 may be turned on, and the second switch SW2 may be turned off.

During the first period PD1, the sensing voltage VSS of a (4n−3)-th pixels ('n' is a positive integer) of the first pixel row PXA1 may be measured. In an embodiment, for example, the sensing voltage VSS of the first pixel PX1 may be measured during the first period PD1.

The second period PD2 may proceed after the first period PD1. During the second period PD2, the first scan signal may be provided to the first scan line S1, the first switch SW1 may be turned off, and the second switch SW2 may be turned on.

During the second period PD2, the sensing voltage VSS of a (4n−1)-th pixels of the first pixel row PXA1 may be measured. In an embodiment, for example, the sensing voltage VSS of the third pixel PX3 may be measured during the second period PD2.

A first width WD1 of the first period PD1 may be the same as a second width WD2 of the second period PD2. The width of each period may indicate the time in which each period expires or the time duration. That is, the fact that the first width WD1 is the same as the second width WD2 may indicate that the time duration of the first period PD1 is the same as the time duration of the second period PD2.

The third period PD3 may proceed after the second period PD2. During the third period PD3, a second scan signal may be provided to the second scan line S2, and the first switch SW1 and the second switch SW2 may be turned off.

During the third period PD3, a black current may be applied to the plurality of data lines DL1 to DLn. During the third period PD3, 2n-th pixels of a pixel row connected to the second scan line S2 may display black (or a black image). In an embodiment, for example, during the third period PD3, the second pixel PX2 and the fourth pixel PX4 may display black.

According to an embodiment of the disclosure, during the third period PD3, a second scan signal may be provided to the second scan line S2, and 2n-th pixels among the plurality of pixels PX (see FIG. 3) connected to the second scan line S2 may display black. During the third period PD3, black may be displayed to the user. That is, a screen of the display device DD displayed to the user during an operation of the first sensing mode SM1 may be black. While the display device DD compensates for the unique characteristic value in the first sensing mode SM1, the user may perceive a black image on the screen of the display device DD. The user may visually perceive an image in the emission mode DM (see FIG. 8) after the first sensing mode SM1.

A third width WD3 of the third period PD3 may be less (or shorter) than the first width WD1 and the second width WD2.

During the first period PD1 and the second period PD2, the sensing voltage VSS of (2n−1)-th pixels of the first pixel row PXA1 may be measured. The remaining 2n-th pixels of the first pixel row PXA1 may be indirectly sensed by estimating the degree of deterioration based on the sensing voltage VSS of adjacent pixels. In an embodiment, for example, each of the remaining 2n-th pixels of the first pixel row PXA1 may be indirectly sensed by estimating the degree of deterioration based on the sensing voltage VSS of the (2n−1)-th pixels. Alternatively, each of the remaining 2n-th pixels of the first pixel row PXA1 may be indirectly sensed by estimating the degree of deterioration based on the sensing voltage VSS of pixels adjacent in the first direction DR1 and the second direction DR2. In an embodiment, for example, the second pixel PX2 may be indirectly sensed based on the sensing voltages VSS sensed by each of the first pixel PX1, the third pixel PX3, and the sixth pixel PX6. A method of measuring the sensing voltage VSS of even-numbered pixels or odd-numbered pixels for the indirect sensing may be referred to as a "grid structure data measuring method".

According to an embodiment of the disclosure, due to the grid structure data measuring method, the analog front end AFE may be electrically connected to the plurality of pixels PX (see FIG. 3). FIG. 4 shows an embodiment where one analog front end AFE is positioned per four pixels of each of a plurality of pixel rows. In such an embodiment, the number of analog front end AFEs included in the data driver DDV may be reduced, and the size of the data driver DDV may be reduced. Accordingly, an area size of the peripheral area NA (see FIG. 1) of the display device DD (see FIG. 1) may be reduced.

According to an embodiment of the disclosure, the display panel DP may directly sense only some of the pixels by using the indirect sensing method, thereby reducing the time of the first sensing mode SM1. In such an embodiment, because the third width WD3 is less than the first width WD1 and the second width WD2, the time of the first sensing mode SM1 may be shortened. When a user turns on the display device DD, the display panel DP may quickly enter the emission mode DM after ending the first sensing mode SM1. A time taken before the user turns on the display device DD and then perceives an image from the display device DD may be shortened. Accordingly, the display device DD may have improved reliability.

The fourth period PD4 may proceed after the third period PD3. During the fourth period PD4, a third scan signal may be provided to the third scan line S3, and the first switch SW1 and the second switch SW2 may be turned off.

During the fourth period PD4, a black current may be applied to the plurality of data lines DL1 to DLn. During the fourth period PD4, (2n−1)-th pixels of a pixel row connected to the third scan line S3 may display black. In an embodiment, for example, during the fourth period PD4, the fifth pixel PX5 and the seventh pixel PX7 may display black.

The fourth width WD4 of the fourth period PD4 may be the same as the third width WD3.

The fifth period PD5 may proceed after the fourth period PD4. During the fifth period PD5, a fourth scan signal may be provided to the fourth scan line S4, the first switch SW1 may be turned on, and the second switch SW2 may be turned off.

During the fifth period PD5, the sensing voltage VSS of a (4n−2)-th pixels of the second pixel row PXA2 may be measured. In an embodiment, for example, the sensing voltage VSS of the sixth pixel PX6 may be measured during the fifth period PD5.

The fifth width WD5 of the fifth period PD5 may be the same as the first width WD1 of the first period PD1.

The sixth period PD6 may proceed after the fifth period PD5. During the sixth period PD6, the fourth scan signal may be provided to the fourth scan line S4, the first switch SW1 may be turned off, and the second switch SW2 may be turned on.

During the sixth period PD6, the sensing voltage VSS of the 4n-th pixel of the second pixel row PXA2 may be measured. In an embodiment, for example, the sensing voltage VSS of the eighth pixel PX8 may be measured during the sixth period PD6.

The sixth width WD6 of the sixth period PD6 may be the same as the fifth width WD5 of the fifth period PD5.

During the fifth period PD5 and the sixth period PD6, the sensing voltage VSS of 2n-th ('n' is a positive integer) pixels of the second pixel row PXA2 may be measured. The remaining (2n−1)-th pixels of the second pixel row PXA2 may be indirectly sensed by estimating the degree of deterioration based on the sensing voltage VSS of 2n-th pixels and the sensing voltage VSS of (2n−1)-th pixels of the first pixel row PXA1 measured during the first period PD1 and the second period PD2.

According to an embodiment of the disclosure, the display panel DP may directly sense only some of the pixels by using the indirect sensing method, thereby reducing the time of the first sensing mode SM1. In such an embodiment, because the fourth width WD4 is less than the fifth width WD5 and the sixth width WD6, the time of the first sensing mode SM1 may be shortened. When a user turns on the display device DD, the display panel DP may quickly enter the emission mode DM after ending the first sensing mode SM1. A time taken before the user turns on the display device DD and then perceives an image from the display device DD may be shortened. Accordingly, the display device DD may have improved reliability.

Figure 9B:
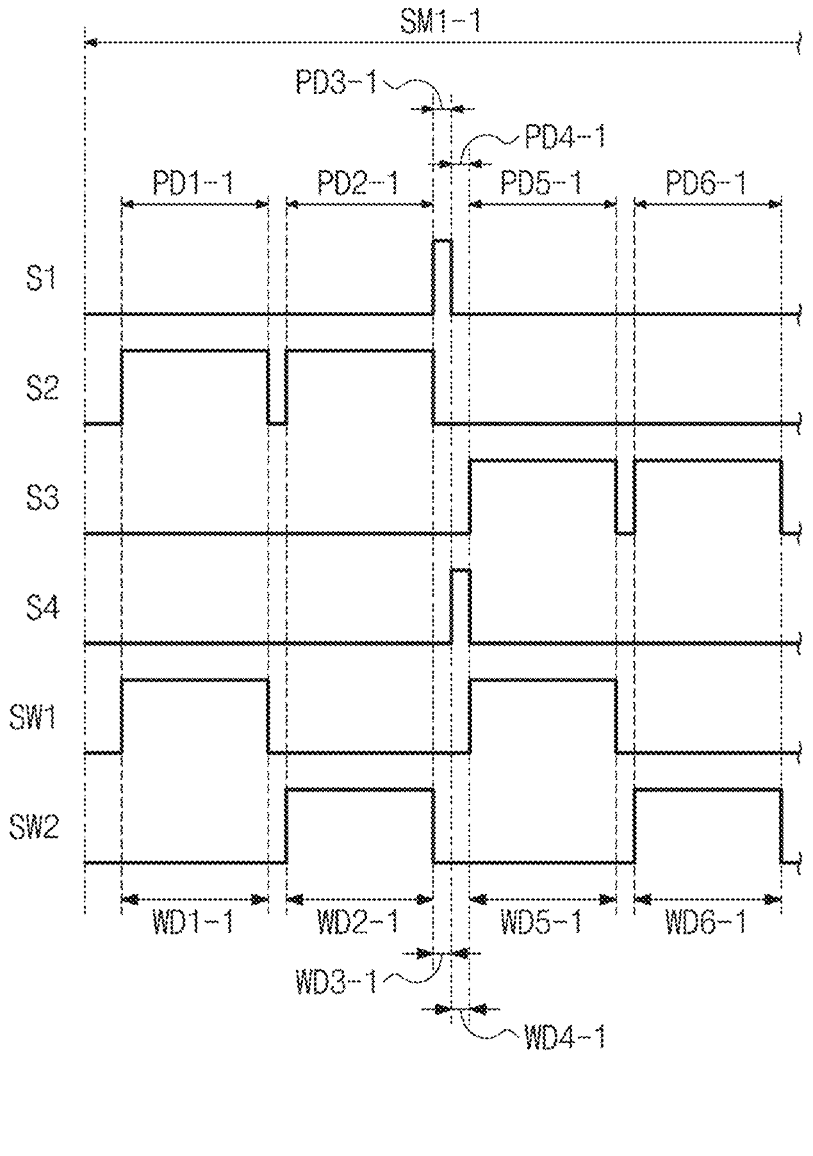
FIG. 9B is a waveform diagram of driving signals for driving pixels in a first sensing mode, according to an embodiment of the disclosure.

FIG. 9B is a waveform diagram of driving signals for driving pixels in a first sensing mode, according to an embodiment of the disclosure. In the description of FIG. 9B, the same reference numerals are assigned to the same components described with reference to FIG. 9A, and thus any repetitive detailed descriptions thereof will be omitted to avoid redundancy.

Referring to FIGS. 4 and 9B, a first sensing mode SM1-1 may include a first period PD1-1, a second period PD2-1, a third period PD3-1, a fourth period PD4-1, a fifth period PD5-1, and a sixth period PD6-1, which are defined sequentially therein.

During the first period PD1-1, a second scan signal may be provided to the second scan line S2, the first switch SW1 may be turned on, and the second switch SW2 may be turned off.

During the first period PD1-1, the sensing voltage VSS of a (4n−2)-th pixels ('n' is a positive integer) of the first pixel row PXA1 may be measured. In an embodiment, for example, the sensing voltage VSS of the second pixel PX2 may be measured during the first period PD1-1.

The second period PD2-1 may proceed after the first period PD1-1. During the second period PD2-1, the second scan signal may be provided to the second scan line S2, the first switch SW1 may be turned off, and the second switch SW2 may be turned on.

During the second period PD2-1, the sensing voltage VSS of the 4n-th pixel of the first pixel row PXA1 may be measured. In an embodiment, for example, the sensing voltage VSS of the fourth pixel PX4 may be measured during the second period PD2-1.

A first width WD1-1 of the first period PD1-1 may be the same as a second width WD2-1 of the second period PD2-1. The width of each period may indicate the time in which each period expires. That is, the fact that the first width WD1-1 is the same as the second width WD2-1 may indicate that the time of the first period PD1-1 is the same as the time of the second period PD2-1.

The third period PD3-1 may proceed after the second period PD2-1. During the third period PD3-1, a first scan signal may be provided to the first scan line S1, and the first switch SW1 and the second switch SW2 may be turned off.

During the third period PD3-1, a black current may be applied to the plurality of data lines DL1 to DLn. During the third period PD3-1, (2n−1)-th pixels of a pixel row connected to the first scan line S1 may display black. In an embodiment, for example, during the third period PD3, the first pixel PX1 and the third pixel PX3 may display black.

According to an embodiment of the disclosure, during the third period PD3-1, the first scan signal may be provided to the first scan line S1, and (2n−1)-th pixels among the plurality of pixels PX (see FIG. 3) connected to the first scan line S1 may display black. During the third period PD3-1, black may be displayed to the user. That is, a screen of the display device DD displayed to the user during an operation of the first sensing mode SM1-1 may be black. While the display device DD compensates for the unique characteristic value in the first sensing mode SM1-1, the user may perceive a black image on the screen of the display device DD. The user may visually perceive an image in the emission mode DM (see FIG. 8) after the first sensing mode SM1-1.

A third width WD3-1 of the third period PD3-1 may be less than the first width WD1-1 and the second width WD2-1.

During the first period PD1-1 and the second period PD2-1, the sensing voltage VSS of 2n-th pixels of the first pixel row PXA1 may be measured. The remaining (2n−1)-th pixels of the first pixel row PXA1 may be indirectly sensed by estimating the degree of deterioration based on the sensing voltage VSS of adjacent pixels. In an embodiment, for example, each of the remaining (2n−1)-th pixels of the first pixel row PXA1 may be indirectly sensed by estimating the degree of deterioration based on the sensing voltage VSS of the 2n-th pixels. Alternatively, each of the remaining (2n−1)-th pixels of the first pixel row PXA1 may be indirectly sensed by estimating the degree of deterioration based on the sensing voltage VSS of pixels adjacent in the first direction DR1 and the second direction DR2. In an embodiment, for example, the third pixel PX3 may be indirectly sensed based on the sensing voltages VSS sensed by each of the second pixel PX2, the fourth pixel PX4, and the seventh pixel PX7.

According to an embodiment of the disclosure, due to the grid structure data measuring method, the analog front end AFE may be electrically connected to the plurality of pixels PX (see FIG. 3). FIG. 4 shows an embodiment where one analog front end AFE is positioned per four pixels of each of a plurality of pixel rows. The number of analog front end AFEs included in the data driver DDV may be reduced, and the size of the data driver DDV may be reduced. Accordingly, an area size of the peripheral area NA (see FIG. 1) of the display device DD (see FIG. 1) may be reduced.

According to an embodiment of the disclosure, the display panel DP may directly sense only some of the pixels by using the indirect sensing method, thereby reducing the time of the first sensing mode SM1-1. In such an embodiment, because the third width WD3-1 is less than the first width WD1-1 and the second width WD2-1, the time of the first sensing mode SM1-1 may be shortened. When a user turns on the display device DD, the display panel DP may quickly enter the emission mode DM after ending the first sensing mode SM1-1. A time taken before the user turns on the display device DD and then perceives an image from the display device DD may be shortened. Accordingly, the display device DD may have improved reliability.

The fourth period PD4-1 may proceed after the third period PD3-1. During the fourth period PD4-1, a fourth scan signal may be provided to the fourth scan line S4, and the first switch SW1 and the second switch SW2 may be turned off.

During the fourth period PD4-1, a black current may be applied to the plurality of data lines DL1 to DLn. During the fourth period PD4-1, 2n-th pixels of a pixel row connected to the fourth scan line S4 may display black. In an embodiment, for example, during the fourth period PD4-1, the sixth pixel PX6 and the eighth pixel PX8 may display black.

The fourth width WD4-1 of the fourth period PD4-1 may be the same as the third width WD3-1.

The fifth period PD5-1 may proceed after the fourth period PD4-1. During the fifth period PD5-1, a third scan signal may be provided to the third scan line S3, the first switch SW1 may be turned on, and the second switch SW2 may be turned off.

During the fifth period PD5-1, the sensing voltage VSS of a (4n−3)-th pixels of the second pixel row PXA2 may be measured. In an embodiment, for example, the sensing voltage VSS of the fifth pixel PX5 may be measured during the fifth period PD5-1.

The fifth width WD5-1 of the fifth period PD5-1 may be the same as the first width WD1-1 of the first period PD1-1.

The sixth period PD6-1 may proceed after the fifth period PD5-1. During the sixth period PD6-1, the third scan signal may be provided to the third scan line S3, the first switch SW1 may be turned off, and the second switch SW2 may be turned on.

During the sixth period PD6-1, the sensing voltage VSS of a (4n−1)-th pixels of the second pixel row PXA2 may be measured. In an embodiment, for example, the sensing voltage VSS of the seventh pixel PX7 may be measured during the sixth period PD6-1.

The sixth width WD6-1 of the sixth period PD6-1 may be the same as the fifth width WD5-1 of the fifth period PD5-1.

During the fifth period PD5-1 and the sixth period PD6-1, the sensing voltage VSS of (2n−1)-th ('n' is a positive integer) pixels of the second pixel row PXA2 may be measured. The remaining 2n-th pixels of the second pixel row PXA2 may be indirectly sensed by estimating the degree of deterioration based on the sensing voltage VSS of (2n−1)-th pixels and the sensing voltage VSS of 2n-th pixels of the first pixel row PXA1 measured during the first period PD1-1 and the second period PD2-1.

According to an embodiment of the disclosure, the display panel DP may directly sense only some of the pixels by using the indirect sensing method, thereby reducing the time of the first sensing mode SM1-1. In such an embodiment, because the fourth width WD4-1 is less than the fifth width WD5-1 and the sixth width WD6-1, the time of the first sensing mode SM1-1 may be shortened. When a user turns on the display device DD, the display panel DP may quickly enter the emission mode DM after ending the first sensing mode SM1-1. A time taken before the user turns on the display device DD and then perceives an image from the display device DD may be shortened. Accordingly, the display device DD with improved reliability may be provided.

Figure 10:
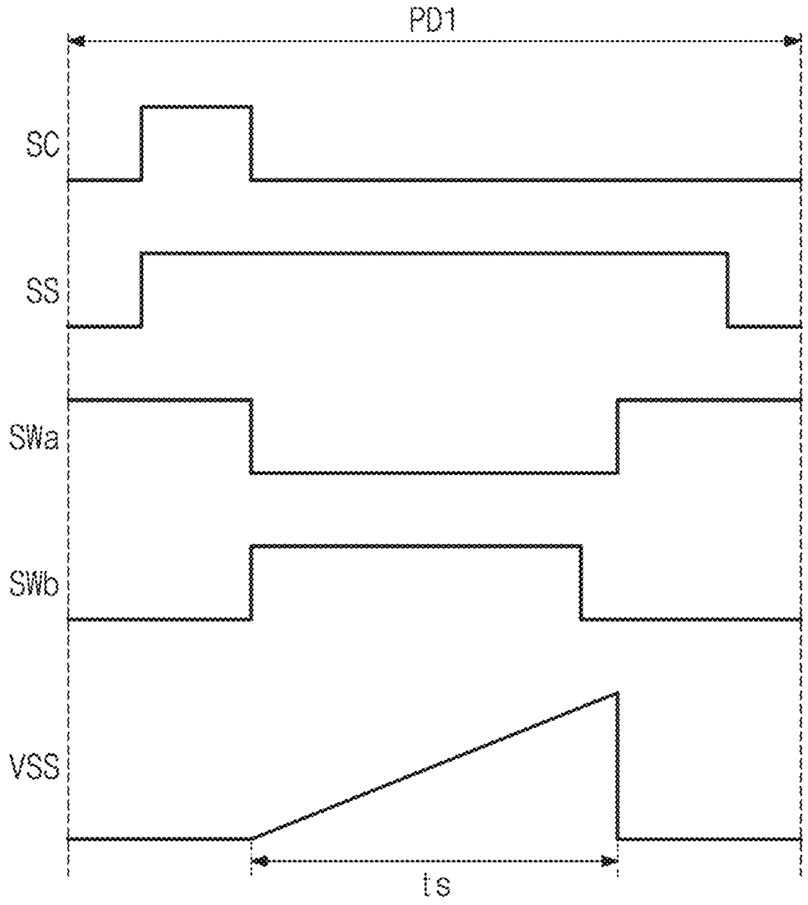
FIG. 10 is a waveform diagram of signals provided in a first period, according to an embodiment of the disclosure.

FIG. 10 is a waveform diagram of signals provided in a first period, according to an embodiment of the disclosure.

Referring to FIGS. 5, 9A, and 10, a first scan signal SC may be provided to a gate node of the switching transistor T2. The first scan signal SC may be provided through the first scan line S1. The sensing signal SS may be provided to a gate node of the sensing transistor T3.

A pulse width of the first scan signal SC may be less than a pulse width of the sensing signal SS. The first scan signal SC and the sensing signal SS may be turned on at the same time.

The sensing transistor T3 may be turned on while the sensing signal SS is activated. At this time, the first pixel switch SWa may be turned on, and thus the initialization voltage Vinit may initialize the first node N1.

The switching transistor T2 may be turned on while the first scan signal SC is activated. In an embodiment, the data driver DDV may provide a predetermined data signal to the data line DL to measure a change in characteristics of an element of each of the plurality of pixels PX (see FIG. 3) during the first sensing mode SM1. Regardless of the data signal of an input image, the data signal corresponds to a voltage set as a predetermined voltage. The data signal may be applied to the gate node of the driving transistor T1, and thus the voltage of the first node N1 may increase. The voltage of the first node N1 may be the sensing voltage VSS.

After the first scan signal SC is deactivated, the first pixel switch SWa may be turned off and the second pixel switch SWb may be turned on. When the first pixel switch SWa is turned off and the second pixel switch SWb is turned on, the sensing line SL may be electrically connected to the data driver DDV, and thus the data driver DDV may sense the sensing voltage VSS measured through the sensing line SL.

The data driver DDV may measure a change in the sensing voltage VSS that increases during a sensing time ts. The sensing voltage VSS may be information indicating a characteristic change of each element of the plurality of pixels PX (see FIG. 3), and may be provided to the timing controller T-CON.

FIG. 10 shows driving signals of the first period PD1 in an embodiment. In such an embodiment, the sensing voltage VSS in the second period PD2, the fifth period PD5, and the sixth period PD6 may be sensed in the same way as that in the first period PD1.

Figure 11:
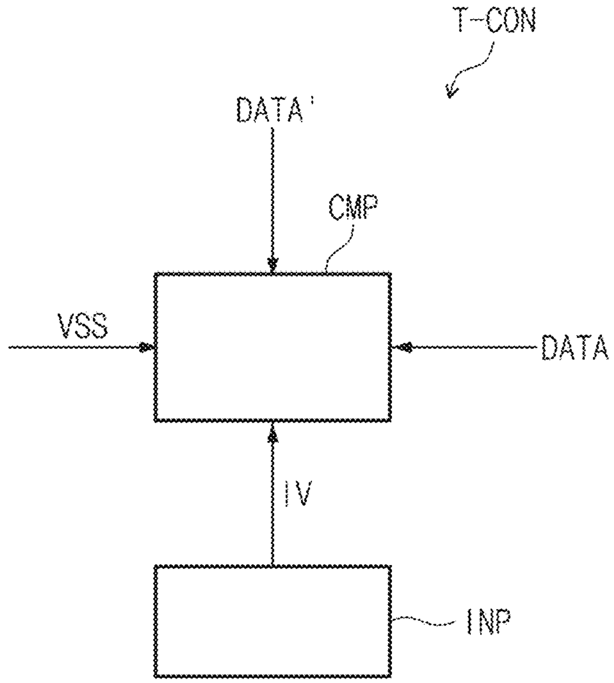
FIG. 11 is a block diagram of a timing controller, according to an embodiment of the disclosure.

FIG. 11 is a block diagram of a timing controller, according to an embodiment of the disclosure.

FIG. 11 shows a configuration of the timing controller T-CON related to a compensation operation for compensating for the plurality of pixels PX (see FIG. 3).

Referring to FIGS. 3, 5, 8, and 11, in an embodiment, the timing controller T-CON may include a compensation part CMP and an initial value storage part INP.

The initial value storage part INP may store an initial gate-source voltage of the driving transistor T1 as an initial value IV. In an embodiment, for example, during the manufacturing process of the display panel DP, the display panel DP may be driven in a black mode, and the unique characteristic value of the driving transistor T1 may be sensed by the sensing operation of the first sensing mode SM1. That is, the initial gate-source voltage of the initial value IV may be set as the initial gate-source voltage of the driving transistor T1.

In the manufacturing process of the display panel DP, the use of the driving transistor T1 may substantially correspond to an initial use, and the unique characteristic value of the driving transistor T1 may be sensed in a state where the driving transistor T1 hardly deteriorates. This sensing value may substantially correspond to an initial current-voltage characteristic curve (I-V curve) of the driving transistor T1, and may be stored in the initial value storage part INP.

As the usage time of the display panel DP increases after the display panel DP is manufactured, the unique characteristic value of the driving transistor T1 may deteriorate, and thus an I-V curve of the driving transistor T1 may be changed. The initial value IV stored in the initial value storage part INP may be a reference value for comparison with the changed I-V curve of the driving transistor T1. In an embodiment, for example, the initial gate-source voltage of the initial value IV may be compared with the gate-source voltage of the driving transistor T1 of which the unique characteristic value is changed.

During the first sensing mode SM1, the sensing voltage VSS may be sensed. The sensing voltage VSS may be a gate-source voltage sensed at the driving transistor T1.

When the plurality of pixels PX are driven in the emission mode DM, the compensation part CMP may compensate for data DATA' applied to each of the plurality of pixels PX based on a compensation value. The compensation part CMP may output compensated image data DATA by compensating for the data DATA'. The compensated image data DATA may be referred to as "image data DATA".

In an embodiment, the image signals RGB may be converted to the data DATA', and the data DATA' may be compensated. Afterward, the compensated image data DATA may be provided to the data driver DDV.

According to an embodiment of the disclosure, a data voltage compensated by the compensated image data DATA may be generated, and the compensated data voltage may be provided to each of the plurality of pixels PX. The data voltage applied to each of the plurality of pixels PX may be compensated, thereby improving the luminance uniformity of the display panel DP. Accordingly, the display device DD (see FIG. 1) may have improved display quality.

Figure 12:
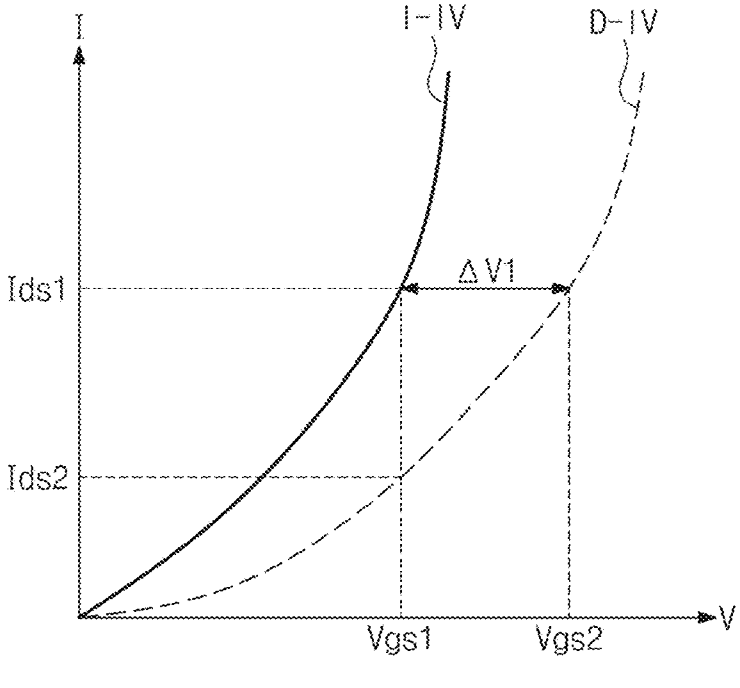
FIG. 12 is a graph showing a current-voltage characteristic curve (I-V curve), according to an embodiment of the disclosure.

FIG. 12 is a graph showing an I-V curve, according to an embodiment of the disclosure.

In FIG. 12, an initial I-V curve I-IV of the driving transistor T1 is shown with a solid line. As the usage time of the driving transistor T1 increases, the unique characteristic value of the driving transistor T1 may deteriorate. In FIG. 12, a deterioration I-V curve D-IV of the driving transistor T1 when the unique characteristic value of the driving transistor T1 deteriorates is shown with a dotted line. As the usage time of the driving transistor T1 increases, the initial I-V curve I-IV may be changed to the deterioration I-V curve D-IV.

In FIG. 12, a vertical axis may be a current value 'I' and may refer to a drain-source current of the driving transistor T1. In FIG. 12, a horizontal axis may be a voltage value 'V' and may refer to a gate-source voltage of the driving transistor T1.

According to the initial I-V curve I-IV, a first drain-source current Ids' may flow into the driving transistor T1 based on the first gate-source voltage Vgs1 at an initial stage of driving the driving transistor T1. When the driving transistor T1 deteriorates, a second drain-source current Ids2 lower than the first drain-source current Ids' may flow into the driving transistor T1 based on a first gate-source voltage Vgs1 based on the deterioration I-V curve D-IV.

The compensation part CMP may calculate a difference value between the first gate-source voltage Vgs1 and the second gate-source voltage Vgs2. The difference value may be defined as a first voltage value ΔV1. The first voltage value ΔV1 may be defined as a compensation value. The compensation part CMP may calculate the compensation value during the first sensing mode SM1.

During the emission mode DM, the compensation part CMP may output the image data DATA by compensating for the data DATA' based on the first voltage value ΔV1. In an embodiment, for example, a data value may be changed such that the data DATA' corresponding to the first gate-source voltage Vgs1 is converted into the image data DATA corresponding to the second gate-source voltage Vgs2. Accordingly, a compensated data voltage corresponding to the compensated image data DATA may be applied to each of the plurality of pixels PX (see FIG. 3).

The compensated data voltage may correspond to the second gate-source voltage Vgs2. According to the deterioration I-V curve D-IV, the first drain-source current Ids' may be applied to each of the plurality of pixels PX (see FIG. 3) depending on the second gate-source voltage Vgs2. Accordingly, the plurality of pixels PX (see FIG. 3) may be compensated and driven.

In a case, where a low current is supplied to the light emitting diode OLED due to the deterioration of the driving transistor T1, the luminance uniformity of the display panel DP may deteriorate. According to an embodiment of the disclosure, the compensation part CMP may calculate the first voltage value ΔV1 based on the sensing voltage VSS and then may output the image data DATA by compensating the data DATA' based on the first voltage value ΔV1. During the emission mode DM, a data voltage compensated by the compensated image data may be generated, and the compensated data voltage may be provided to each of the plurality of pixels PX. In such an embodiment, the data voltage applied to each of the plurality of pixels PX may be compensated, thereby improving the luminance uniformity of the display panel DP. Accordingly, the display device DD (see FIG. 1) with improved display quality may be provided.

In embodiments of the invention, as described above, a data voltage compensated by compensated image data may be generated, and the compensated data voltage may be provided to each of a plurality of pixels. The data voltage applied to each of the plurality of pixels may be compensated, thereby improving the luminance uniformity of a display panel. Accordingly, a display device may have improved display quality.

In embodiments of the invention, as described above, the display panel may directly sense only some of the pixels by using an indirect sensing method, thereby reducing the time of a sensing mode. In such an embodiment, a third width of a third period may be less than a first width of a first period and a second width of a second period, thereby reducing the time of the sensing mode. Accordingly, in such embodiments, when a user turns on the display device, a display panel may quickly enter an emission mode after ending a sensing mode. A time taken before the user turns on the display device and then perceives an image from the display device may be shortened. Accordingly, it is possible to provide a display device with improved reliability.

The invention should not be construed as being limited to the embodiments set forth herein. Rather, these embodiments are provided so that this disclosure will be thorough and complete and will fully convey the concept of the invention to those skilled in the art.

While the invention has been described with reference to embodiments thereof, it will be apparent to those of ordinary skill in the art that various changes and modifications may be made thereto without departing from the spirit or scope of the invention as defined by the following claims.

What is claimed is:

1. A display device comprising:

a display panel which operates in a sensing mode or an emission mode;

a data driver electrically connected to the display panel; and a compensation part electrically connected to the data driver, wherein the display panel includes:

a first pixel;

a second pixel spaced from the first pixel in a first direction;

a third pixel spaced from the second pixel in the first direction;

a fourth pixel spaced from the third pixel in the first direction;

a fifth pixel spaced from the first pixel in a second direction crossing the first direction;

a sixth pixel spaced from the second pixel in the second direction;

a first scan line electrically connected to the first pixel and the third pixel;

a second scan line electrically connected to the sixth pixel;

a first data line electrically connected to the first pixel, the second pixel, the fifth pixel, and the sixth pixel; and a second data line electrically connected to the third pixel and the fourth pixel, wherein the data driver includes:

a first switch electrically connected to the first pixel and the second pixel; and a second switch electrically connected to the third pixel and the fourth pixel, wherein the sensing mode includes:

a first period in which a first scan signal is provided to the first scan line and the first switch is turned on; and a second period in which the first scan signal is provided to the first scan line and the second switch is turned on, and wherein the compensation part compensates for image data, which is to be provided to the second pixel, based on a voltage sensed in each of the first pixel, the third pixel, and the sixth pixel.

2. The display device of claim 1, wherein the first pixel includes a light emitting diode and a pixel driving circuit electrically connected to the light emitting diode, and wherein the pixel driving circuit includes:

a driving transistor which drives the light emitting diode;

a sensing transistor electrically connected between a first node of the driving transistor and a reference voltage line; and a switching transistor electrically connected between a second node of the driving transistor and the first data line and including a gate node connected to the first scan line.

3. The display device of claim 2, wherein the sensing transistor is electrically connected to a sensing line, and wherein the sensing line is electrically connected to the first switch.

4. The display device of claim 1, wherein the display panel further includes:

a seventh pixel spaced from the third pixel in the second direction;

an eighth pixel spaced from the fourth pixel in the second direction;

a third scan line electrically connected to the second pixel and the fourth pixel; and a fourth scan line electrically connected to the fifth pixel and the seventh pixel, wherein the second scan line is further electrically connected to the eighth pixel, and wherein the second data line is further electrically connected to the seventh pixel and the eighth pixel.

5. The display device of claim 4, wherein the sensing mode further includes a third period in which a third scan signal is provided to the third scan line, and wherein the first period, the second period, and the third period are defined sequentially in the sensing mode.

6. The display device of claim 5, wherein a first width of the first period is equal to a second width of the second period, and wherein a third width of the third period is less than the first width and the second width.

7. The display device of claim 5, wherein, in the first period, the second switch is turned off, wherein, in the second period, the first switch is turned off, and wherein, in the third period, the first switch and the second switch are turned off.

8. The display device of claim 5, wherein, in the third period, the second pixel and the fourth pixel display black.

9. The display device of claim 5, wherein the sensing mode further includes:

a fourth period in which a fourth scan signal is provided to the fourth scan line;

a fifth period in which a second scan signal is provided to the second scan line and the first switch is turned on; and a sixth period in which the second scan signal is provided to the second scan line and the second switch is turned on.

10. The display device of claim 1, wherein a voltage of the first pixel is measured in the first period, and a voltage of the third pixel is measured in the second period.

11. The display device of claim 1, wherein the emission mode proceeds after the sensing mode.

12. The display device of claim 1, wherein the compensation part compensates for image data, which is to be provided to the first pixel, based on a voltage sensed in the first period.

13. A display device comprising:

a display panel which operates in a sensing mode or an emission mode; and a data driver electrically connected to the display panel, wherein the display panel includes:

a first pixel row including a first pixel, a second pixel, a third pixel, and a fourth pixel, which are arranged in a first direction;

a second pixel row spaced from the first pixel row in a second direction crossing the first direction, and including a fifth pixel, a sixth pixel, a seventh pixel and an eighth pixel, which are arranged in the first direction;

a first scan line electrically connected to at least one pixel of the first pixel row;

a second scan line electrically connected to at least one pixel of the second pixel row;

a first data line electrically connected to the first pixel, the second pixel, the fifth pixel, and the sixth pixel;

a second data line electrically connected to the third pixel, the fourth pixel, the seventh pixel, and the eighth pixel;

a first sensing line electrically connected to the first pixel, the second pixel, the fifth pixel, and the sixth pixel; and a second sensing line electrically connected to the third pixel, the fourth pixel, the seventh pixel, and the eighth pixel, wherein the data driver includes:

a first switch connected to the first sensing line; and a second switch connected to the second sensing line, and wherein the sensing mode includes:

a first period in which the first switch is turned on and the second switch is turned off;

a second period, which is after the first period and in which the first switch is turned off and the second switch is turned on;

a third period, which is after the second period and in which the first switch is turned on and the second switch is turned off; and a fourth period, which is after the third period and in which the first switch is turned off and the second switch is turned on.

14. The display device of claim 13, wherein, in the first period, a first scan signal is provided to the first scan line and a voltage of the first pixel is sensed through the first sensing line, wherein, in the second period after the first period, the first scan signal is provided to the first scan line, and a voltage of the third pixel is sensed through the second sensing line, wherein, in the third period after the second period, a second scan signal is provided to the second scan line, and a voltage of the sixth pixel is sensed through the first sensing line, and wherein, in the fourth period after the third period, the second scan signal is provided to the second scan line, and a voltage of the eighth pixel is sensed through the second sensing line.

15. The display device of claim 14, wherein the display panel further includes:

a third scan line electrically connected to remaining pixels of the first pixel row; and a fourth scan line electrically connected to remaining pixels of the second pixel row, and wherein the sensing mode further includes:

a fifth period, which is between the second period and the third period and in which a third scan signal is provided to the third scan line; and a sixth period, which is between the fifth period and the third period and in which a fourth scan signal is provided to the fourth scan line.

16. The display device of claim 15, wherein a first width of the first period is equal to a second width of the second period, and wherein a third width of the fifth period is less than the first width and the second width.

17. The display device of claim 15, wherein, in the fifth period, the second pixel and the fourth pixel display black.

18. The display device of claim 14, further comprising:

a compensation part electrically connected to the data driver, wherein the compensation part compensates for image data, which is to be provided to the display panel, based on voltages sensed in the first to fourth periods.

19. The display device of claim 13, wherein the emission mode proceeds after the sensing mode.

20. A display panel driving circuit comprising:

a data driver including a first switch connected to a first data line, and a second switch connected to a second data line spaced from the first data line in a first direction, wherein the data driver senses a sensing voltage;

a scan driver which generates a first scan signal and a second scan signal and is electrically connected to a first scan line and a second scan line, which are arranged in a second direction crossing the first direction; and a timing controller which receives the sensing voltage, compensates for image data based on the sensing voltage, and controls the data driver and the scan driver based on a sensing mode or an emission mode, and wherein the sensing mode includes:

a first period in which the first scan signal is provided to the first scan line, the first switch is turned on, and the second switch is turned off;

a second period in which the first scan signal is provided to the first scan line, the first switch is turned off, and the second switch is turned on; and a third period in which the second scan signal is provided to the second scan line, and the first switch and the second switch are turned off.

* * * * *